US010350910B2

(12) United States Patent
Miwa et al.

(10) Patent No.: US 10,350,910 B2
(45) Date of Patent: Jul. 16, 2019

(54) FOIL IMAGE FORMATION METHOD
(71) Applicant: Konica Minolta, Inc., Tokyo (JP)
(72) Inventors: Hideya Miwa, Tokyo (JP); Takayuki Ishikawa, Chiba (JP); Ryuichi Hiramoto, Hyogo (JP); Hitomi Motani, Tokyo (JP)
(73) Assignee: KONICA MINOLTA, INC., Tokyo (JP)
( * ) Notice: Subject to any disclaimer, the term of this patent is extended or adjusted under 35 U.S.C. 154(b) by 0 days.
(21) Appl. No.: 15/326,595
(22) PCT Filed: Jul. 24, 2015
(86) PCT No.: PCT/JP2015/071063
§ 371 (c)(1),
(2) Date: Jan. 16, 2017
(87) PCT Pub. No.: WO2016/013644
PCT Pub. Date: Jan. 28, 2016
(65) Prior Publication Data
US 2017/0203581 A1 Jul. 20, 2017
(30) Foreign Application Priority Data
Jul. 25, 2014 (JP) .................................. 2014-151699
Aug. 27, 2014 (JP) .................................. 2014-172547
(51) Int. Cl.
*B41J 11/00* (2006.01)
*B32B 5/00* (2006.01)
(Continued)
(52) U.S. Cl.
CPC .............. *B41J 11/002* (2013.01); *B32B 5/022* (2013.01); *B32B 7/14* (2013.01); *B32B 15/082* (2013.01);
(Continued)
(58) Field of Classification Search
CPC ... B41J 11/00; B41J 11/002; B41J 2/00; B41J 2/01; B32B 5/00; B32B 5/002;
(Continued)

(56) References Cited
U.S. PATENT DOCUMENTS

2004/0095451 A1* 5/2004 Tatsumi ............... B41J 11/0015
347/101
2005/0167035 A1 8/2005 Laskey
(Continued)

FOREIGN PATENT DOCUMENTS

EP    2 423 270 A1    2/2012
EP    2535200 A2 *    12/2012    ............ B41M 3/006
(Continued)

OTHER PUBLICATIONS

Partial Supplementary European Search Report dated May 3, 2018 from corresponding European Application No. 15824717.1.
(Continued)

*Primary Examiner* — Seyed Masoud Malekzadeh
*Assistant Examiner* — Matthew Hoover
(74) *Attorney, Agent, or Firm* — Lucas & Mercanti, LLP

(57) ABSTRACT

The present invention addresses at least the problem of providing a method for forming a high-resolution foil image regardless of the hydrophilicity of a recording medium. In order to solve said problem, the present invention provides a method wherein an adhesive ink that is formed by dispersing or dissolving a polymer resin in water and in a water-soluble organic solvent is used as an adhesive for a foil, the adhesive is applied by means of inkjet printing, and a foil image is formed. The polymer resin of the adhesive ink is a polymer of a monomer that includes (meth)acrylic acid and a (meth)acrylic acid alkyl ester having a $C_{2-12}$ alkyl group, the acid value of the polymer resin being 50-120 mg KOH/g, and the glass transition temperature of the polymer resin being 30-110° C.

5 Claims, 6 Drawing Sheets

(51) Int. Cl.
| | |
|---|---|
| B32B 7/00 | (2019.01) |
| B32B 15/00 | (2006.01) |
| B32B 27/00 | (2006.01) |
| B32B 37/00 | (2006.01) |
| B41J 2/00 | (2006.01) |
| B44C 1/00 | (2006.01) |
| C09D 11/00 | (2014.01) |
| C09J 5/00 | (2006.01) |
| C09J 11/00 | (2006.01) |
| E04F 13/00 | (2006.01) |
| B41J 2/01 | (2006.01) |
| C09D 11/30 | (2014.01) |
| C09J 11/06 | (2006.01) |
| C09J 133/00 | (2006.01) |
| E04F 13/07 | (2006.01) |
| B32B 5/02 | (2006.01) |
| B32B 7/14 | (2006.01) |
| B32B 15/082 | (2006.01) |
| B32B 15/12 | (2006.01) |
| B32B 15/14 | (2006.01) |
| B32B 27/30 | (2006.01) |
| B32B 37/12 | (2006.01) |
| C09J 5/06 | (2006.01) |
| C09J 133/06 | (2006.01) |
| C09J 133/12 | (2006.01) |
| B41M 3/00 | (2006.01) |
| B44C 1/17 | (2006.01) |
| B41M 3/12 | (2006.01) |
| B41M 3/18 | (2006.01) |

(52) U.S. Cl.
CPC ............. *B32B 15/12* (2013.01); *B32B 15/14* (2013.01); *B32B 27/304* (2013.01); *B32B 37/025* (2013.01); *B32B 37/1292* (2013.01); *B41J 2/01* (2013.01); *B41M 3/006* (2013.01); *B41M 3/12* (2013.01); *B44C 1/1729* (2013.01); *B44C 1/1733* (2013.01); *C09D 11/30* (2013.01); *C09J 5/00* (2013.01); *C09J 5/06* (2013.01); *C09J 11/06* (2013.01); *C09J 133/00* (2013.01); *C09J 133/062* (2013.01); *C09J 133/12* (2013.01); *E04F 13/07* (2013.01); *B32B 2250/02* (2013.01); *B32B 2255/02* (2013.01); *B32B 2255/10* (2013.01); *B32B 2255/12* (2013.01); *B32B 2255/26* (2013.01); *B32B 2327/06* (2013.01); *B32B 2333/08* (2013.01); *B32B 2607/02* (2013.01); *B41M 3/18* (2013.01); *C09J 2203/10* (2013.01); *C09J 2205/31* (2013.01); *C09J 2400/163* (2013.01); *C09J 2400/263* (2013.01); *C09J 2400/283* (2013.01); *C09J 2427/006* (2013.01); *C09J 2433/00* (2013.01)

(58) Field of Classification Search
CPC .... B32B 7/00; B32B 7/10; B32B 7/14; B32B 15/00; B32B 15/08; B32B 15/082; B32B 15/10; B32B 15/12; B32B 15/14; B32B 27/00; B32B 27/30; B32B 27/30; B32B 27/304; B32B 37/00; B32B 37/02; B32B 37/025; B32B 37/10; B32B 37/12; B32B 37/129; B32B 37/1292; B41M 3/00; B41M 3/006; B44C 1/00; B44C 1/10; B44C 1/17; B44C 1/172; B44C 1/1729; C09D 11/00; C09D 11/30; C09J 5/00; C09J 5/06; C09J 11/00; C09J 11/06; C09J 133/00; C09J 133/06; C09J 133/062; C09J 133/10; C09J 133/12; E04F 13/00; E04F 13/07

See application file for complete search history.

(56) References Cited

U.S. PATENT DOCUMENTS

2010/0178425 A1* 7/2010 Ooishi ................ C09D 11/322
427/256
2012/0033011 A1   2/2012 Ohya

FOREIGN PATENT DOCUMENTS

| EP | 2535200 A2 | 12/2012 | |
|---|---|---|---|
| EP | 2565241 A1 * | 3/2013 | .......... C09D 11/322 |
| EP | 2565241 A1 | 3/2013 | |
| JP | 2002264495 A | 9/2002 | |
| JP | 2009226863 A | 10/2009 | |
| JP | 2009279538 A | 12/2009 | |
| JP | 2011037112 A | 2/2011 | |
| JP | 2012211228 A | 11/2012 | |
| JP | 2013000964 A | 1/2013 | |
| WO | 03/020519 A1 | 3/2003 | |
| WO | 03020519 A1 | 3/2003 | |
| WO | 2011136000 A1 | 3/2011 | |
| WO | 2014/005823 A1 | 1/2014 | |

OTHER PUBLICATIONS

International Search Report dated Oct. 27, 2015 for PCT/JP2015/071063 and English translation.

Notice of Reasons for Rejection dated Jul. 17, 2018 from corresponding Japanese Patent Application No. JP 2016-535983 and English translation.

Extended European Search Report dated Oct. 9, 2018 from corresponding European Application No. EP 15824717.1.

* cited by examiner

FOIL IMAGE FORMATION METHOD

CROSS REFERENCE TO RELATED APPLICATION

This Application is a 371 of PCT/JP2015/071063 filed on Jul. 24, 2015, which, in turn, claimed the priority of Japanese Patent Application No. JP 2014-151699 filed Jul. 25, 2014 and Japanese Patent Application No. JP 2014-172547 filed Aug. 27, 2014, all applications are incorporated herein by reference.

TECHNICAL FIELD

The present invention relates to a foil image forming method.

BACKGROUND ART

A foil image is known as an image having high-quality feel and high designability. The foil image is an image formed by adhesion of foil, such as metal foil, in a desired shape to a recording medium made of paper, fabric or the like. The foil image has been generally formed by pressing metal foil onto a recording medium by hot stamping or the like. In such a method, a plate (stamp) has been required to be formed along the shape of the foil image, and the foil image has been difficult to modify for each small lot and/or to form at a low cost. The foil image has been then demanded to be formed by digital printing or the like without use of any plate.

In recent years, decoration wallpaper and the like on which decoration is provided by digital printing have enjoyed popularity. Such decoration wallpaper has been produced by laminating a decoration sheet layer on lining paper, or directly providing decoration on lining paper (foil pressing or the like). A vinyl chloride sheet or the like is known as the decoration sheet layer, and a natural pulp substrate, a mixed substrate (non-woven fabric wallpaper) of natural pulp and a synthetic resin, or the like is known as the lining paper. Such a wallpaper material has also been demanded to have the foil image formed thereon, and the foil image has been demanded to be formed by digital printing in terms of production efficiency, cost, and the like.

In recent years, as the method for forming the foil image, a method has been proposed which includes transferring metal foil to a recording medium to which an adhesive has been applied in a desired shape, by heat-pressure bonding to form the foil image on the recording medium. For the adhesive, an aqueous adhesive having a microcapsule including a thermoplastic resin is used (see, for example, PTL 1).

An aqueous adhesive mainly includes water. Water has a lower volatilization rate than an organic solvent. Therefore, in the foil image forming method, the aqueous adhesive landed as droplets on the recording medium has a sufficiently high fluidity even on the recording medium. Accordingly, the aqueous adhesive landed may bleed on a recording medium having a high hydrophilicity. Furthermore, adjacent droplets of the aqueous adhesive landed may mutually coalesce on a recording medium having a low hydrophilicity, and thus be more roughly distributed in a patchy fashion. Such a phenomenon then occurs to easily impair fineness of the foil image.

Thus, the conventional foil image forming method using an aqueous adhesive has the problem of sometimes forming no predetermined foil image depending on hydrophilicity of a recording medium.

On the other hand, a method has also been proposed which includes forming an ink image by an actinic radiation-curable inkjet ink, and pressure bonding the ink image and transfer foil to allow the foil to be transferred in a pattern (for example, PTL 2).

Furthermore, a method has also been proposed which includes forming an ink image by an actinic radiation-curable inkjet ink, and temporarily curing the ink image and then pressure bonding it to transfer foil, to allow the foil to be transferred in a pattern (PTL 3).

CITATION LIST

Patent Literatures

PTL 1
Japanese Patent Application Laid-Open No. 2002-264495
PTL 2
Japanese Patent Application Laid-Open No. 2009-279538
PTL 3
Japanese Patent Application Laid-Open No. 2009-226863

SUMMARY OF INVENTION

Technical Problem

The present invention provides a method for forming a high-definition foil image at least regardless of hydrophilicity of a recording medium.

Solution to Problem

A first aspect of the present invention relates to a foil image forming method below.

[1] A foil image forming method including: applying, by an inkjet printing method, an adhesive ink to at least one of a recording medium or a foil sheet in a shape corresponding to a foil image to be formed, heat-pressure bonding the recording medium and foil of the foil sheet, and peeling the foil sheet from the recording medium to form the foil image on the recording medium, in which the adhesive ink contains water, a water-soluble organic solvent and a copolymer resin, the copolymer resin is a copolymer of a monomer containing (meth)acrylic acid and a (meth)acrylic acid alkyl ester having a $C_{2-12}$ alkyl group, and is dispersed or dissolved in the adhesive ink, an acid value of the copolymer resin is 50 to 120 mgKOH/g, and a glass transition temperature of the copolymer resin is 30 to 110° C.

[2] The foil image forming method according to [1], in which a content of the (meth)acrylic acid alkyl ester in the monomer is 5 to 50 mass %.

[3] The foil image forming method according to [1] or [2], in which the water-soluble organic solvent is at least one selected from the group consisting of glycol ethers, $C_4$ or higher 1,2-alkanediols, and β-alkoxypropionamides.

[4] The foil image forming method according to any one of [1] to [3], in which the adhesive ink further contains a surfactant.

[5] The foil image forming method according to any one of [1] to [4], further including heating the recording medium before application of the adhesive ink to 35 to 100° C.

[6] The foil image forming method according to any one of [1] to [5], in which the recording medium is a wallpaper material.

[7] The foil image forming method according to [6], in which the wallpaper material includes a non-woven fabric in which natural pulp and synthetic fiber are mixed.

A second aspect of the present invention relates to a foil image forming method and a laminated article below.

[8] A foil image forming method including: dropping an actinic radiation-curable inkjet ink that contains a gelling agent, a photocurable compound and a photopolymerization initiator and that undergoes sol-gel phase transition depending on a temperature, onto a recording medium to form an ink image containing droplets of the actinic radiation-curable inkjet ink; pressure bonding a transfer surface of transfer foil having a foil layer to the ink image to transfer the foil layer onto the ink image; and irradiating the ink image with an actinic radiation to cure the actinic radiation-curable inkjet ink, allowing the foil layer to be fixed on the recording medium, in which the actinic radiation-curable inkjet ink contains 0.5 to 10 mass % of the gelling agent based on a total mass of the actinic radiation-curable inkjet ink, and a difference between a temperature of the recording medium in landing of the actinic radiation-curable inkjet ink and a sol-gel phase transition temperature of the actinic radiation-curable inkjet ink is 30° C. or more.

[9] The foil image forming method according to [8], in which the difference between a temperature of the recording medium in landing of the actinic radiation-curable inkjet ink and a sol-gel phase transition temperature of the actinic radiation-curable inkjet ink is 30° C. or more and 70° C. or less.

[10] The foil image forming method according to [8] or [9], in which the gelling agent is represented by general formula (1) or (2) below:

$$R_1\text{—CO—}R_2 \quad (1)$$

in which $R_1$ and $R_2$ each represent a $C_{1\text{-}24}$ linear or branched hydrocarbon group, and any one of $R_1$ and $R_2$ has a $C_{12}$ or higher linear alkyl structure; and

$$R_3\text{—COO—}R_4 \quad (2)$$

in which $R_3$ represents a $C_{1\text{-}24}$ linear or branched hydrocarbon group, $R_4$ represents a hydrogen atom or a $C_{1\text{-}24}$ linear or branched hydrocarbon group, and any one of $R_3$ and $R_4$ has a $C_{12}$ or higher linear alkyl structure.

[11] The foil image forming method according to any one of [8] to [10], in which the recording medium is a wallpaper material.

[12] The foil image forming method according to [11], in which the wallpaper material includes a non-woven fabric in which natural pulp and synthetic fiber are mixed.

[13] A laminated article including a recording medium, an adhesive layer formed on the recording medium in a pattern shape, and a foil layer formed on the adhesive layer, in which the adhesive layer includes a cured product of an actinic radiation-curable inkjet ink that contains a gelling agent, a photocurable compound and a photopolymerization initiator and that undergoes sol-gel phase transition depending on a temperature.

[14] The laminated article according to [13], in which the recording medium is a wallpaper material.

Advantageous Effects of Invention

The adhesive ink in the first aspect of the present invention, while being an aqueous adhesive, has proper amphipathicity (hydrophilicity and hydrophobicity) and is also thickened rapidly after landing on the recording medium. Accordingly, the adhesive ink exhibits a sufficient adhesion force, and is then inhibited from being spread due to wetting on the recording medium. Accordingly, the first aspect of the present invention can allow a high-definition foil image to be formed regardless of hydrophilicity of the recording medium.

The foil image forming method according to the second aspect of the present invention can also allow foil to be transferred in a pattern including a fine line, can also allow a foil image to be formed without any defects occurring on a recording medium having irregularities, and furthermore, hardly causes cracking, floating or the like of the foil transferred.

DESCRIPTION OF EMBODIMENTS

Figure 1:
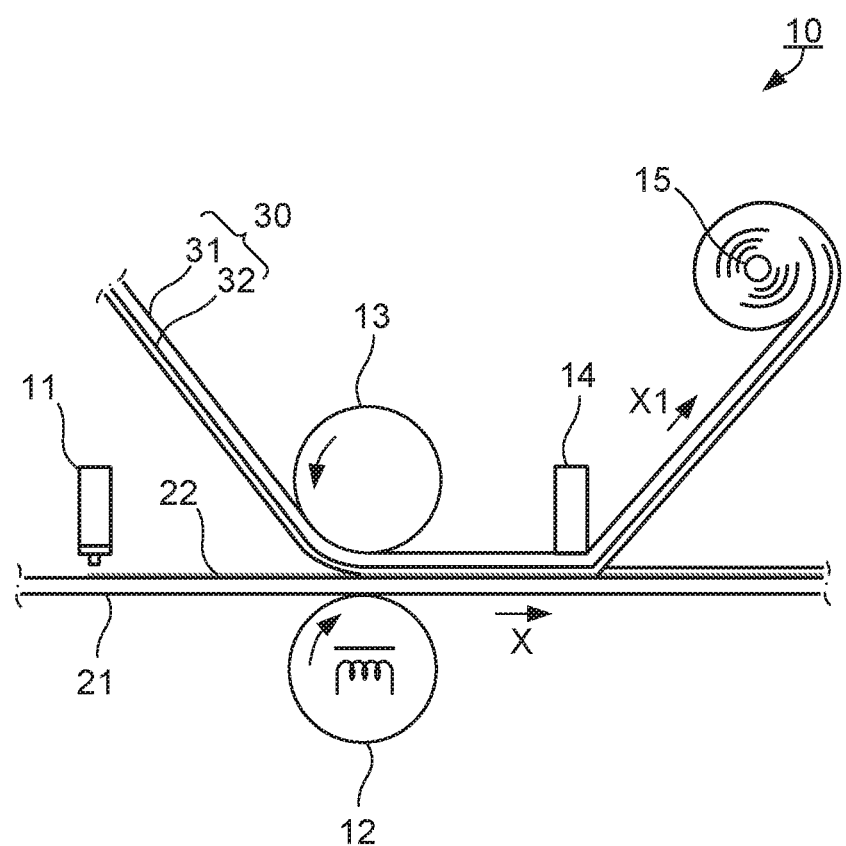
FIG. 1 schematically illustrates one configuration example of a foil image forming apparatus for use in a foil image forming method of Embodiment 1 of the present invention.

The present invention encompasses an embodiment (Embodiment 1) in which an aqueous adhesive is used to form a foil image, and an embodiment (Embodiment 2) in which an actinic radiation-curable ink is used to form a foil image. Such Embodiments are separately described.

1. Embodiment 1

Hereinafter, Embodiment 1 of the present invention is described.

A foil image forming method according to the present embodiment includes applying, by an inkjet printing method, an adhesive ink to at least one of a recording medium or a foil sheet in a shape corresponding to a foil image to be formed, heat-pressure bonding the recording medium and the foil of the foil sheet, and peeling the foil sheet from the recording medium to form the foil image on the recording medium. The foil image forming method can be performed by a known foil image forming method described in, for example, PTL 1, except that an adhesive ink described later is used. Such a known foil image forming method includes applying an adhesive to a recording medium by an inkjet printing method, and transferring foil by heat-pressure bonding.

The adhesive ink contains water, a water-soluble organic solvent and a copolymer resin. That is, the adhesive ink is a liquid composition including water as a main solvent and including the above materials uniformly mixed, and, when further containing a water-insoluble additive, the adhesive ink is the liquid composition in which the additive is dispersed. Hereinafter, the adhesive ink is described.

The copolymer resin is a copolymer of a monomer including (meth)acrylic acid and a (meth)acrylic acid alkyl ester having a $C_{2-12}$ alkyl group. The copolymer resin is, for example, a copolymer resin that can be dissolved in water by a neutralization reaction with a base, and is present in the adhesive ink with being dispersed or dissolved therein. Herein, the term "(meth)acrylic acid" means one or both of acrylic acid and methacrylic acid.

The content of the (meth)acrylic acid in the monomer can be appropriately determined as long as the acid value (50 to 120 mgKOH/g) of the copolymer resin, described later, is satisfied. While the content of the (meth)acrylic acid in the monomer cannot be generally defined because it also depends on other compound in the monomer, the content can be selected from the range from 5 to 20 mass %, for example.

The (meth)acrylic acid alkyl ester may be included singly or in combination of two or more in the adhesive ink. The (meth)acrylic acid alkyl ester is included in the adhesive ink to thereby allow the alkyl chain to exhibit proper hydrophobicity and flexibility, easily resulting in increases in abrasion resistance and adhesiveness of a foil image to be obtained. From such viewpoints, the content of the (meth)acrylic acid alkyl ester in the monomer is preferably 5 to 50 mass %, more preferably 10 to 30 mass %.

The content of a (meth)acrylic acid alkyl ester having a $C_{6-12}$ alkyl group as the (meth)acrylic acid alkyl ester in the monomer is preferably 5 mass % or more from the viewpoints of abrasion resistance and adhesiveness of the foil image. On the other hand, the content is preferably 20 mass % or less from the viewpoint that ink repellent property is required around the nozzle of an inkjet head, more preferably 5 to 10 mass % from the above viewpoints.

The content of a (meth)acrylic acid alkyl ester having a $C_{2-4}$ alkyl group as the (meth)acrylic acid alkyl ester in the monomer is preferably 5 to 40 mass %, more preferably 5 to 20 mass % from the above viewpoints.

The (meth)acrylic acid alkyl ester is more preferably included in combination of two: a (meth)acrylic acid alkyl ester having a $C_{6-12}$ alkyl group and a (meth)acrylic acid alkyl ester having a $C_{2-4}$ alkyl group, from the above viewpoints.

Examples of the (meth)acrylic acid alkyl ester having a $C_{2-4}$ alkyl group include ethyl (meth)acrylate, n-butyl (meth)acrylate, i-butyl (meth)acrylate and t-butyl (meth)acrylate. Examples of the (meth)acrylic acid alkyl ester having a $C_{6-12}$ alkyl group include n-hexyl (meth)acrylate, cyclohexyl (meth)acrylate, octyl (meth)acrylate, 2-ethylhexyl (meth)acrylate and lauryl (meth)acrylate.

The monomer may further include a monomer other than the (meth)acrylic acid and the (meth)acrylic acid alkyl ester as long as at least one of the effects of the present embodiment is exerted. Examples of such other monomer include other (meth)acrylic acid alkyl esters such as methyl methacrylate, acid monomers other than (meth)acrylic acid, (meth)acrylic acid esters other than alkyl esters, and styrene. Examples of such acid monomers include itaconic acid, maleic acid and maleic acid half esters.

In particular, methyl methacrylate is preferable from the viewpoint of abrasion resistance of the foil image. Methyl methacrylate is presumed to serve as a hard core exhibiting impact resistance in the copolymer resin as an adhesive component. The content of methyl methacrylate in the monomer is preferably 15 to 85 mass %, more preferably 40 to 80 mass % from the above viewpoint.

The acid value of the copolymer resin as the copolymer of the monomer is 50 to 120 mgKOH/g. If the acid value is less than 50 mgKOH/g, affinity of the adhesive ink with the recording medium is insufficient, and if the acid value is more than 120 mgKOH/g, affinity of the adhesive ink with the foil is insufficient. In both such cases, abrasion resistance and adhesion strength of the foil image may be insufficient. In addition, if the acid value is less than 50 mgKOH/g, the adhesive ink dried on an inkjet head is hardly removed by dissolving and wiping. The acid value of the copolymer resin is preferably 50 to 100 mgKOH/g from the above viewpoints.

The acid value of the copolymer resin can be measured by a titration method. The acid value of the copolymer resin can be increased by, for example, an increase in the content ratio of the (meth)acrylic acid to the (meth)acrylic acid alkyl ester in the monomer.

The glass transition temperature Tg of the copolymer resin is 30 to 110° C. When the Tg is within the range, the foil image achieves sufficient and good abrasion resistance. This is considered to be due to the fact that a thin adhesive ink layer to be formed between the foil and the recording medium is not brittle at room temperature even after heat-pressure bonding and retains proper flexibility.

The Tg can be measured by differential scanning calorimetry (DSC), and can be appropriately adjusted by, for example, selection of the alkyl group structure of the (meth)acrylic acid alkyl ester in the monomer.

The weight average molecular weight Mw of the copolymer resin is preferably 20,000 or more from the viewpoint of an increase in abrasion resistance of the foil image, and is preferably 80,000 or less from the viewpoints of an increase in ejection property of the adhesive ink and an increase in maintenance property at an inkjet head. The Mw is more preferably 2,500 to 70,000 from the above viewpoints.

The Mw can be measured by gel permeation chromatography (GPC), and can be increased by, for example, an increase in the concentration of the monomer in the copolymer resin in copolymerization. In addition, the Mw can be decreased by an increase in the amount of a polymerization initiator.

The content of the copolymer resin in the adhesive ink is preferably 1 to 15 mass %, more preferably 3 to 10 mass % from viewpoints of the viscosity of the adhesive ink, drying of the adhesive ink landed on the recording medium, adhesiveness of the adhesive ink, and the like related to discharge property and maintenance property of an inkjet head.

When the adhesive ink contains a pigment, the content of the copolymer resin in the adhesive ink is preferably 1-fold or more the solid content of the pigment from the viewpoint that good abrasion resistance, adhesiveness and the like of an image (latent image) formed on the recording medium by the adhesive ink are achieved. On the other hand, the content is preferably 15-fold or less from the viewpoint that ejection property, maintenance property and the like of the adhesive ink are not impaired. The content of the copolymer resin in the adhesive ink based on the solid content of the pigment is more preferably 1 to 10-fold from the above viewpoints.

A part or all of the acidic group of (meth)acrylic acid or the acid monomer in the copolymer resin is preferably neutralized by a base from the viewpoint of an increase in water solubility of the copolymer resin. The adhesive ink is preferably the aqueous solution containing water, a water-soluble organic solvent and the copolymer resin from the viewpoint that properties of the adhesive ink are stabilized. Examples of the base include alkali metal-containing bases such as sodium hydroxide and potassium hydroxide, amines such as an alkanolamine and an alkylamine, and ammonia.

In particular, the base is preferably ammonia, or amines having a boiling point of 100 to 200° C. from the viewpoint of an increase in solubility of the copolymer resin and from the viewpoint of an increase in durability of a thin layer of the adhesive ink on the recording medium, and is particularly preferably ammonia, N,N-dimethylaminoethanol or 2-amino-2-methylpropanol from the viewpoint of an increase in ejection stability of the adhesive ink.

If the amount of the base to be added to the adhesive ink is too small, neutralization of the copolymer resin may be insufficient, and if the amount is too large, water resistance of a thin layer of the adhesive ink may be deteriorated and any odor may be generated. Therefore, the amount to be added is preferably 0.8 to 3.0 equivalents relative to the acidic group of the copolymer resin. The amount to be added can be determined by detection and quantitative determination of a salt.

The water-soluble organic solvent may be adopted singly or in combination of two or more. The water-soluble organic solvent means an organic solvent that is dissolved in water in a concentration of 20 mass % or more at an ordinary temperature. The content of the water-soluble organic solvent in the adhesive ink is preferably 1 to 50 mass %, more preferably 10 to 40 mass % from the viewpoints that wettability of the adhesive ink to the recording medium is controlled and that the adhesive ink landed is inhibited from being admixed due to thickening by drying of the ink.

Examples of the water-soluble organic solvent include glycol ethers, $C_4$ or higher 1,2-alkanediols, and β-alkoxypropionamides.

Examples of the glycol ethers include ethylene glycol monoethyl ether, ethylene glycol monobutyl ether, diethylene glycol monoethyl ether, diethylene glycol monobutyl ether, triethylene glycol monobutyl ether, propylene glycol monopropyl ether, dipropylene glycol monomethyl ether and tripropylene glycol monomethyl ether.

Examples of the 1,2-alkanediols include 1,2-butanediol, 1,2-pentanediol, 1,2-hexanediol and 1,2-heptanediol.

Examples of the β-alkoxypropionamides include a compound represented by the following formula.

[Formula 1]

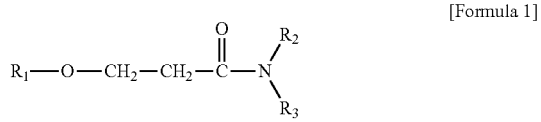

In the formula, $R_1$ represents a $C_{1-6}$ linear or branched alkyl group, and $R_2$ and $R_3$ each represent a hydrogen atom, or a $C_{1-4}$ linear or branched alkyl group. $R_2$ and $R_3$ may be the same or different. Preferable examples of $R_1$ include a methyl group, an ethyl group and a n-butyl group, and preferable examples of $R_2$ and $R_3$ include a methyl group and an ethyl group.

The compound represented by the formula is preferable from the viewpoints of an increase in solubility of the copolymer resin in the adhesive ink, good permeability into the recording medium, and an increase in compatibility of the copolymer resin with water. The content of the compound represented by the formula in the adhesive ink is preferably 1.0 to 40 mass % from the above viewpoints.

The water-soluble organic solvent preferably includes the compound represented by the above formula, and one or both of the glycol ethers and the 1,2-alkanediols from the viewpoint that, when droplets of the adhesive ink are landed on a recording medium having a low hydrophilicity, the droplets are inhibited from coalescing, to provide a high-definition foil image. This is considered to be due to the fact that both the glycol ethers and the 1,2-alkanediols have a relatively low surface tension.

The adhesive ink mainly contains water, besides the copolymer resin and the water-soluble organic solvent. The content of water in the adhesive ink is, but not particularly limited, for example, 10 mass % or more.

The adhesive ink may also further contain a component other than the copolymer resin and the water-soluble organic solvent as long as at least one of the effects of the present embodiment is exerted. Examples of such other component include a surfactant, other organic solvent, other resin, and a pigment.

The adhesive ink may include one or more surfactants. Examples of the surfactant include an anionic surfactant, a nonionic surfactant, a cationic surfactant, a silicone-based surfactant and a fluorochemical surfactant.

Examples of the anionic surfactant include dialkylsulfosuccinic acid salts, alkylnaphthalenesulfonic acid salts and fatty acid salts.

Examples of the nonionic surfactant include polyoxyethylene alkyl ethers, polyoxyethylene alkyl allyl ethers, acetylene glycols, and polyoxyethylene-polyoxypropylene block copolymers.

Examples of the cationic surfactant include alkylamine salts and quaternary ammonium salts.

Examples of the silicone-based surfactant include a polyether-modified polysiloxane compound, and commercial products thereof include KF-351A and KF-642 produced by Shin-Etsu Chemical Co., Ltd., and BYK345, BYK347 and BYK348 produced by BYK Japan.

The fluorochemical surfactant means a common surfactant in which hydrogen bound to carbon of a hydrophobic group is partially or fully substituted with fluorine. The fluorochemical surfactant preferably has a perfluoroalkyl group in the molecule.

The fluorochemical surfactant is commercially sold, for example, under the trade name MEGAFAC (registered trademark of DIC Corporation) from the company, under the trade name SURFLON (registered trademark of AGC Seimi Chemical Co., Ltd.) from Asahi Glass Co., Ltd., under the trade name Fluorad FC from 3M Company, under the trade name Monflor from Imperial Chemical Industries, under the trade name Zonyls from E. I. du Pont de Nemours and Company, and under the trade name Licowet VPF from Farbwerke Hoechst AG.

The fluorochemical surfactant is classified to an anionic, cationic or nonionic surfactant depending on the kind of the hydrophilic group, and is more preferably a nonionic fluorochemical surfactant. Preferable examples of the nonionic fluorochemical surfactant include MEGAFAC F-144D produced by DIC Corporation, and SURFLON S-141 and 145 produced by Asahi Glass Co., Ltd. Examples of an ampholytic fluorochemical surfactant include SURFLON S-131 and 132 produced by Asahi Glass Co., Ltd.

The surfactant is preferably the silicone-based surfactant or the fluorochemical surfactant from the viewpoint of adjusting wettability of the adhesive ink to the recording medium. The surfactant is preferable for allowing droplets of the adhesive ink to wet a recording medium having a low hydrophilicity without any droplets repelled, and preferable for allowing droplets of the adhesive ink not to be too spread on a recording medium having a high hydrophilicity. The silicone-based surfactant or the fluorochemical surfactant is particularly preferably used in combination with the glycol ethers or the 1,2-alkanediols which are each the above-mentioned water-soluble organic solvent having a low surface tension.

The content of the surfactant in the adhesive ink is preferably 0.1 to 2 mass %, more preferably 0.2 to 1 mass % from the viewpoint that both of at least one of the effects of the present embodiment and at least one of the effects of the surfactant are achieved.

Other organic solvent as described above may be used singly or in combination of two or more. Examples of such other organic solvent include a swellable organic solvent, monohydric alcohol, polyhydric alcohol, amine and amide. The content of such other organic solvent in the adhesive ink can be appropriately determined as long as at least one of the effects of the present embodiment is achieved.

The swellable organic solvent is a solvent that can dissolve, soften or swell the recording medium (for example, a recording medium made of a vinyl chloride resin or the like). The swellable organic solvent is preferable from the viewpoint of an increase in adhesiveness of an adhesion sheet to the recording medium, and from the viewpoint of an increase in abrasion resistance of the foil image.

Examples of the swellable organic solvent include a heterocyclic compound including a nitrogen or sulfur atom, cyclic ester, lactic acid ester, alkylene glycol diether, alkylene glycol monoether monoester and dimethylsulfoxide.

Examples of the heterocyclic compound including a nitrogen atom include cyclic amide compounds such as 2-pyrrolidone, N-methyl-2-pyrrolidone, N-ethyl-2-pyrrolidone, 1,3-dimethyl-2-imidazolidinone, ε-caprolactam, methylcaprolactam and 2-azacyclooctanone. Examples of the heterocyclic compound including a sulfur atom include 5 to 7-membered compounds such as sulfolane.

Examples of the cyclic ester include γ-butyrolactone and ε-caprolactone, and examples of the lactic acid ester include butyl lactate and ethyl lactate. Examples of the alkylene glycol diether include diethylene glycol diethyl ether, and examples of the alkylene glycol monoether monoester include diethylene glycol monoethyl monoacetate.

Examples of the monohydric alcohol include methanol, ethanol, propanol, isopropanol, butanol, isobutanol, secondary butanol and tertiary butanol. Examples of the polyhydric alcohol include ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol.

Examples of the amine include ethanolamine, diethanolamine, triethanolamine, N-methyldi ethanol amine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine. Examples of the amide include formamide, N,N-dimethylformamide and N,N-dimethylacetamide.

Other resin above may be adopted singly or in combination of two or more. Such other resin can be appropriately selected depending on the function, and the content of such other resin in the adhesive ink can be appropriately determined as long as at least one of the effects of the present embodiment is exerted. For example, the content of the copolymer resin as the resin in the adhesive ink is 50 to 100 mass %.

The pigment may be adopted singly or in combination of two or more. Conventionally known organic and inorganic pigments can be used for the pigment. The content of the pigment in the adhesive ink can be appropriately determined as long as at least one of the effects of the present embodiment is exerted. Examples of the pigment include azo pigments such as azo lake, an insoluble azo pigment, a condensed azo pigment and a chelating azo pigment; polycyclic pigments such as a phthalocyanine pigment, perylene and a perylene pigment, an anthraquinone pigment, a quinacridone pigment, a dioxanedine pigment, a thioindigo pigment, an isoindolinone pigment, and a quinophthaloni pigment; dye lakes such as a basic dye lake and an acidic dye lake; organic pigments such as a nitro pigment, a nitroso pigment, aniline black and a daylight fluorescent pigment; and inorganic pigments such as carbon black.

The surface tension of the adhesive ink is preferably 15 mN/m or more from the viewpoint that discharge ability is prevented from being deteriorated due to wetting of the periphery of the nozzle of an inkjet head, and is preferably 35 mN/m or less from the viewpoint that droplets landed on a recording medium having a lower surface energy than a common paper recording medium such as coated paper or a recording medium made of a resin are inhibited from being spread without any deterioration in discharge ability due to wetting of the periphery of the nozzle of an inkjet head.

The surface tension can be measured using a known measuring apparatus such as CBVP-Z model (manufactured by Kyowa Interface Science Co., LTD.). In addition, the surface tension can be adjusted by controlling, for example, the constitutional ratio and the stereo balance of a hydrophobic substituent and a hydrophilic substituent in the molecular structure of the copolymer resin.

The viscosity of the adhesive ink is preferably 5 to 20 mPa·s from the viewpoint of an increase in discharge stability during discharge through an inkjet head, namely, discharge of droplets through a thermal-type or piezo-type head.

The viscosity can be measured using a known viscometer such as an E-type viscometer "V-25 Model" (manufactured by Toki Sangyo Co., Ltd.). In addition, the viscosity can be adjusted by, for example, the content or the molecular weight of the copolymer resin.

The foil image forming method according to the present embodiment can be performed using, for example, an apparatus illustrated in FIG. 1.

Foil image forming apparatus 10 includes inkjet head 11, heating roller 12, support roller 13, peeling member 14 and wind-up roller 15, as illustrated in FIG. 1. Inkjet head 11 is, for example, an on-demand inkjet head, and dischargeably accommodates the adhesive ink. Heating roller 12 is, for example, a rubber roller having a heater therein, and is, for example, disposed so as to be opposite to support roller 13 with a space interposed therebetween, in which the size of the space is the same as or slightly smaller than the sum of the thicknesses of recording medium 21 and foil sheet 30.

Support roller 13 is, for example, a roller rotatably secured at a position opposite to heating roller 12. Peeling member 14 is secured at a position that is located downstream of support roller 13 in the movement direction of the recording medium and that is in contact with the foil sheet (base sheet 31) on the recording medium. Wind-up roller 15 is rotatably disposed at a position that is located downstream of and above peeling member 14.

First, adhesive ink 22 is applied from inkjet head 11 to recording medium 21 being conveyed through a nip section between heating roller 12 and support roller 13 in the direction of arrow X in FIG. 1. Thus, adhesive ink 22 is applied, by an inkjet printing method, to recording medium 21 in a shape corresponding to a foil image to be formed. In the present embodiment, while adhesive ink 22 is preferably applied to recording medium 21, adhesive ink 22 may also be applied to foil 32 of foil sheet 30 or can also be applied to both thereof.

Recording medium 21 is a member on which a foil image is to be formed, and is, for example, a sheet. The material of recording medium 21 can be appropriately determined, and is, for example, paper, fabric, a resin, a metal, or glass. Examples of the recording medium made of paper include normal paper such as thin paper and heavy paper, coated printing sheets, such as wood-free paper, art paper and coated paper, commercially available printing sheets such as Japanese paper and postcard sheet, and a wallpaper material. The wallpaper material includes, for example, a non-woven fabric obtained by mixing natural pulp and synthetic fiber. The adhesive ink is not spread due to wetting after landing thereof and has amphipathicity, and therefore is applied for formation of a foil image on the wallpaper material.

Foil sheet 30 has, for example, base sheet 31, and foil 32 disposed on base sheet 31. A release layer may also be further disposed between base sheet 31 and foil 32. Foil sheet 30 is, for example, a long belt-like sheet wound up by a roll, but may also be one independent sheet. Base sheet 31 is, for example, a resin sheet or a paper sheet. In addition, the release layer is, for example, a thin layer of a fluororesin or a silicone-based resin, or a mixture of such resins and other resins.

Foil 32 is a thin film to be bonded to the recording medium in order to form, on the recording medium, a character, a picture and the like having metal feeling and gloss feeling which are difficult to express by general printing, or a watermarked character, a watermarked picture and the like having transparency. Foil 32 is configured by, for example, a layer of a material that allows light interference to occur, like a colored layer containing a colorant such as a pigment, a metal layer including a metal material, a transparent resin layer, or a laminated article of a hologram layer and a metal layer. Foil 32 can be produced directly on, for example, base sheet 31 by a known method.

Next, foil 32 of foil sheet 30 is heat-pressure bonded to recording medium 21 to which adhesive ink 22 has been applied. Foil sheet 30 is, for example, guided from above, upstream of support roller 13, towards the nip section in the movement direction of recording medium 21, and conveyed in the X direction. Recording medium 21 and foil sheet 30 are mutually pushed at the nip section by elasticity of heating roller 12. Thus, foil sheet 30 is pressure bonded to recording medium 21 in the direction where foil 32 is opposite to recording medium 21. Recording medium 21 and foil sheet 30 are, while being pressure bonded, heated by heating roller 12 so that the temperature of foil 32 is higher than the Tg of the copolymer resin in the adhesive ink by, for example, 0 to 50° C.

Next, foil sheet 30 is peeled from recording medium 21. Recording medium 21 and foil sheet 30 mutually pressure bonded are conveyed to peeling member 14 along the direction of arrow X. The heat-pressure bonding allows foil 32 of foil sheet 30 to be bonded to recording medium 21 at a portion having a desired shape. Recording medium 21 is conveyed in the downstream of peeling member 14 in the direction of arrow X. While foil sheet 30 is pulled upwards by wind-up roller 15, the upward movement thereof is regulated by peeling member 14, and foil sheet 30 is therefore conveyed downstream of peeling member 14 in the direction of arrow X1 by wind-up roller 15, and wound up. Foil sheet 30 is peeled from recording medium 21, and thus only a region of foil 32, bonded to recording medium 21, is separated from foil sheet 30. Thus, a foil image is formed on recording medium 21.

The foil image formation allows a high-definition foil image excellent in durability to be formed. The reason for this is considered as follows.

Adhesive ink 22 is applied to recording medium 21 by landing of droplets thereof onto recording medium 21. The copolymer resin of adhesive ink 22 has a sufficient amount of an alkyl group having a specific length, introduced by the (meth)acrylic acid alkyl ester of the monomer.

The alkyl group has a certain length in droplets of adhesive ink 22, and therefore exhibits large intermolecular interaction. In addition, adhesive ink 22 contains the water-soluble organic solvent, and the copolymer resin has a proper Tg. Therefore, it is considered that droplets of adhesive ink 22 are rapidly thickened by volatilization of the solvent (water) after landing of the droplets, to thereby inhibit ink dots from being spread or deformed.

It is also considered that the copolymer resin has a proper acid value and therefore the acidic group or the alkyl group in the copolymer resin is appropriately oriented to each of recording medium 21 and foil 32 depending on hydrophilicity of recording medium 21 and foil 32, resulting in penetration of a portion of the copolymer resin into fine irregularities on the surfaces of recording medium 21 and foil 32 to exhibit strong adhesiveness to each of recording medium 21 and foil 32.

It is also considered that the alkyl group in the copolymer resin imparts flexibility to a cured product of the adhesive ink. Therefore, it is considered that even if a stress due to strong scratching and/or bending is applied to recording medium 21 on which the foil image is formed, the adhesive layer by the adhesive ink cured is deformed depending on the stress, suppressing cracking and/or peeling of the foil of the foil image.

Furthermore, it is considered that the alkyl group inhibits moisture from penetrating by hydrophobicity, resulting in enhancement in water resistance of the adhesive layer.

It is therefore considered that adhesive ink 22, while having a low viscosity in storage, is rapidly thickened after landing thereof as droplets on recording medium 21, behaves as a semi-solid, and furthermore exhibits the above good adhesiveness when heated. As a result, adhesion property of foil 32 and recording medium 21 with respect to each ink dot is enhanced. Therefore, a high-definition foil image is formed. The adhesive layer has the above proper flexibility, and therefore, for example, even when wallpaper having a foil image, in which a wallpaper material is used for recording medium 21, is used, the foil can be prevented from falling off during construction of the wallpaper. Furthermore, water resistance of the adhesive layer is enhanced, and therefore peeling of the foil due to penetration of moisture over time into the adhesive layer in the foil image can also be prevented.

Herein, the foil image forming method according to the present embodiment may further include any operation other than the above operations as long as at least one of the effects of the present embodiment is exerted. Examples of such other operation include preheating the recording medium.

In the preheating of the recording medium, the recording medium before application of the adhesive ink is heated to increase the temperature of the recording medium to 35 to 100° C. The temperature of the recording medium may, for example, correspond to the temperature of a surface of the recording medium, on which the foil image is to be formed, or the temperature of a surface (rear surface) opposite to the above surface. The preheating can be performed by a known heating apparatus such as a sheet heater, a hot air heater or a heating furnace. The preheating of the recording medium is preferable from the viewpoint that the adhesive ink on the surface of the recording medium is prevented from being spread due to wetting.

As is clear from the foregoing, the foil image forming method according to the present embodiment is a foil image forming method including applying, by an inkjet printing method, an adhesive ink to at least one of a recording medium or a foil sheet in a shape corresponding to a foil image to be formed, heat-pressure bonding the recording medium and the foil of the foil sheet, and peeling the foil sheet from the recording medium to form the foil image on the recording medium, in which the adhesive ink contains water, a water-soluble organic solvent and a copolymer resin, the copolymer resin includes a copolymer of a monomer including (meth)acrylic acid and a (meth)acrylic acid alkyl ester having a $C_{2-12}$ alkyl group, the acid value of the copolymer resin is 50 to 120 mgKOH/g, the copolymer resin is dispersed or dissolved in the adhesive ink, and the glass transition temperature of the copolymer resin is 30 to 110° C. Accordingly, a high-definition foil image can be formed regardless of hydrophilicity of the recording medium.

It is much more effective that the content of the (meth) acrylic acid alkyl ester in the monomer be 5 to 50 mass % from the viewpoints of abrasion resistance and adhesiveness of the foil image which are presumed to be exhibited by proper hydrophobicity and flexibility of the long chain alkyl group in the (meth)acrylic acid alkyl ester.

It is also much more effective that the water-soluble organic solvent be at least one selected from the group consisting of glycol ethers, $C_4$ or higher 1,2-alkanediols, and β-alkoxypropionamides from the viewpoints that wettability of the adhesive ink to the recording medium is controlled and that the adhesive ink landed is inhibited from being admixed due to thickening by drying of the ink.

It is also much more effective that the adhesive ink further contain a surfactant from the viewpoint that wettability of the adhesive ink to the recording medium is controlled.

It is also much more effective that the foil image forming method further include heating the recording medium before application of the adhesive ink, to 35 to 100° C., from the viewpoint that the adhesive ink on the surface of the recording medium is prevented from being spread due to wetting.

In addition, the recording medium is preferably a wallpaper material because at least one of the effects of the present embodiment is more remarkably exerted, and the wallpaper material preferably includes a non-woven fabric obtained by mixing natural pulp and synthetic fiber because at least one of the effects of the present embodiment is much more remarkably exerted.

2. Embodiment 2

Figure 2A:
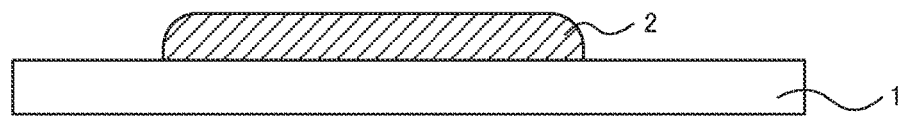
FIGS. 2A to 2D include a process chart illustrating one example of a foil image forming method of Embodiment 2 of the present invention.
Figure 2B:
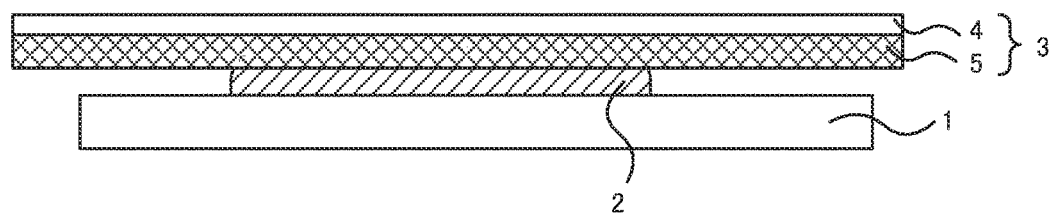
Figure 2C:
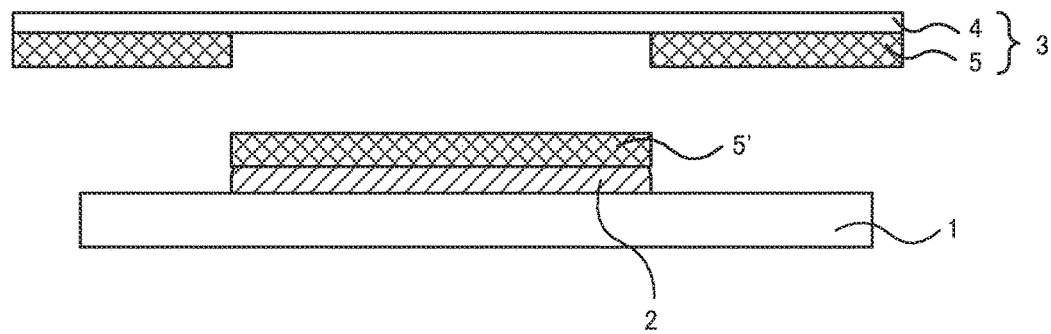
Figure 2D:
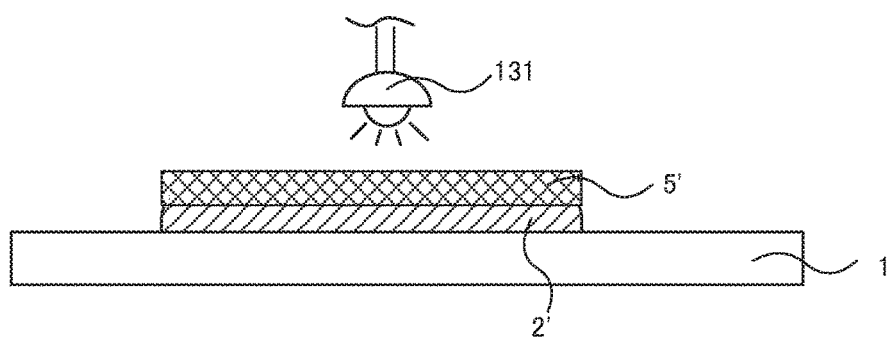

Hereinafter, Embodiment 2 of the present invention is described.
2-1. Foil Image Forming Method
One example of a foil image forming method of the present embodiment is illustrated in FIGS. 2A to 2D. In the foil image forming method of the present embodiment, as illustrated in FIG. 2A, an actinic radiation-curable inkjet ink is applied to recording medium 1 in a pattern shape, to form ink image 2. Next, as illustrated in FIG. 2B, a transfer surface (foil layer 5) of transfer foil 3 including support material 4 and foil layer 5 is closely attached to ink image 2, and pressure-bonded thereto. Thereafter, as illustrated in FIG. 2C, transfer foil 3 is removed. Foil layer 5 pressure bonded to the ink image here remains on ink image 2. On the other hand, foil layer 5 not pressure bonded to ink image 2 is removed together with support material 4. In other words, foil layer 5' remains on recording medium 1 in the pattern shape of ink image 2, and serves as a foil image. Next, as illustrated in FIG. 2D, ink image 2 is irradiated with an actinic radiation from light source 131 to cure the actinic radiation-curable inkjet ink, thereby allowing foil layer 5' to be fixed onto recording medium 1.

A method has been conventionally studied which includes forming an ink image by a common actinic radiation-curable inkjet ink, and transferring foil. If such an actinic radiation-curable inkjet ink is used to form an ink image, however, ink droplets landed on a recording medium are easily spread due to wetting, making it difficult to form a fine pattern. In addition, if the ink is applied to a recording medium having irregularities, ink droplets landed on the recording medium easily penetrate into depressed portions of the recording medium. The thickness of the ink image is thus ununiform, easily causing defects and the like to be generated on a foil image to be obtained.

On the contrary, in the foil image forming method of the present embodiment, an actinic radiation-curable inkjet ink that undergoes sol-gel phase transition depending on the temperature is used to form an ink image. The ink is in the form of a sol when ejected from an inkjet apparatus. On the other hand, the ink rapidly undergoes gelation after landing thereof on the recording medium. Therefore, ink droplets landed on the recording medium are not spread due to wetting, and an ink image including a fine pattern can also be formed.

In addition, the actinic radiation-curable inkjet ink landed on the recording medium rapidly undergoes gelation. Therefore, ink droplets landed on the recording medium hardly penetrate into irregularities of the recording medium. Accordingly, the thickness of an ink image to be obtained is easily uniform, hardly causing defects and the like to be generated on a foil image to be obtained.

The foil image forming method of the present embodiment specifically includes the following three operations:
(1) dropping an actinic radiation-curable inkjet ink that undergoes sol-gel phase transition onto a recording medium to form an ink image including droplets of the actinic radiation-curable inkjet ink;
(2) pressure bonding a transfer surface of transfer foil including a foil layer to the ink image to transfer the foil layer onto the ink image; and
(3) irradiating the ink image with an actinic radiation to cure the actinic radiation-curable inkjet ink, allowing the foil layer to be fixed on the recording medium.
Hereinafter, the respective operations are described.
(1.1) Ink Image Formation
In ink image formation, as illustrated in FIGS. 2A to 2D, an actinic radiation-curable inkjet ink that undergoes sol-gel phase transition is dropped on recording medium 1 to form ink image 2 including droplets of the actinic radiation-curable inkjet ink. Ink image 2 is formed in the same pattern as that of a foil image (image including a foil layer) to be finally obtained.

In the present operation, the actinic radiation-curable inkjet ink is ejected in the form of a sol from the inkjet apparatus. After ink droplets are then landed on the recording medium, the temperature of the recording medium is set to a temperature lower than the sol-gel phase transition temperature of the ink by 30° C. or more so that the ink rapidly undergoes gelation. Thus, the ink droplets landed on the recording medium are not spread due to wetting, and are pinned at a desired position.

(Recording Medium)

In the present operation, the recording medium to which the actinic radiation-curable inkjet ink is to be applied is not particularly limited as long as it includes a material to which an adhesive layer to be obtained by curing the ink can be bonded. As described above, droplets of the actinic radiation-curable inkjet ink in the present embodiment hardly penetrate into depressed portions of a substrate even if the substrate has irregularities. Accordingly, the foil image forming method of the present embodiment can form a foil image even on a recording medium having irregularities.

The recording medium is appropriately selected depending on the application, and can be, for example, any of various plastic substrates, a metal substrate, a glass substrate, a stone substrate, a fabric substrate, a natural pulp substrate, a fleece substrate in which natural pulp and synthetic fiber are mixed, and a Japanese paper substrate. When decoration wallpaper is produced by the foil image forming method of the present embodiment, the recording medium can be a wallpaper material including a natural pulp substrate, a fleece substrate in which natural pulp and synthetic fiber are mixed, a Japanese paper substrate, or the like.

The recording medium may be a single sheet, or a long sheet wound up in the form of a roll. The recording medium may also be any molded article of various resins.

(Actinic Radiation-Curable Inkjet Ink)

The actinic inkjet ink (hereinafter, also simply referred to as "ink") for use in the present operation undergoes sol-gel phase transition. In other words, the ink is in the form of a liquid (sol) at a high temperature (for example, about 80° C.), and has the property of undergoing gelation when cooled. The sol-gel phase transition temperature of the ink in the present embodiment refers to a temperature at which the ink in the form of a sol undergoes gelation to thereby have reduced fluidity when cooled.

The sol-gel phase transition temperature of the actinic radiation-curable inkjet ink is preferably 40° C. or more and 70° C. or less, more preferably 50° C. or more and 65° C. or less. When the ejection temperature from an inkjet apparatus is around 80° C., the sol-gel phase transition temperature of the ink is more than 70° C. to thereby cause gelation to be easily undergone in ejection, resulting in deterioration in ejection property. On the other hand, when the sol-gel phase transition temperature is less than 40° C., the temperature of the recording medium in landing of the ink (sol-gel phase transition temperature—more than 30° C.) is required to be set at less than 10° C., thereby causing the ink image formation to be troublesome.

In addition, the viscosity of the ink at a high temperature (in the form of a sol) is preferably a certain value or less from the viewpoint of an increase in ejection property of ink droplets from the inkjet apparatus. Specifically, the viscosity at 80° C. of the actinic radiation-curable inkjet ink is preferably 3 to 20 mPa·s. On the other hand, the viscosity of the ink landed on the recording medium (in the form of a gel) is preferably a certain value or more from the viewpoint of formation of an ink image having a fine pattern. Specifically, the viscosity at 25° C. of the actinic radiation-curable inkjet ink is preferably 1,000 mPa·s or more.

The viscosity at 80° C., the viscosity at 25° C., and the sol-gel phase transition temperature of the ink can be determined by measuring the change in dynamic viscoelasticity of the ink over the temperature, with a rheometer. Specifically, the ink is heated to 100° C. and cooled to 20° C. in conditions of a shear rate of 11.7 (/s) and a temperature drop rate of 0.1° C./s, thereby providing the curve of the change in viscosity over the temperature. The viscosity at 80° C. and the viscosity at 25° C. can be then determined by reading the viscosity at 80° C. and the viscosity at 25° C. in the curve of the change in viscosity over the temperature, respectively. The sol-gel phase transition temperature can be determined as a temperature at which the viscosity is 200 mPa·s in the curve of the change in viscosity over the temperature.

As the rheometer, a stress controlled rheometer (Physica MCR Series manufactured by Anton Paar) can be used. The diameter of the cone plate can be 75 mm, and the cone angle can be 1.0°.

The actinic radiation-curable inkjet ink includes at least a gelling agent, a photocurable compound and a photopolymerization initiator, and may include, if necessary, a non-polymerizable resin, and the like.

Gelling Agent

The gelling agent included in the actinic radiation-curable inkjet ink has a function of allowing the ink to reversibly undergo sol-gel phase transition depending on the temperature. Such a gelling agent is required at least 1) to be dissolved in the photocurable compound and the like at a temperature higher than the sol-gel phase transition temperature, and 2) to be crystallized at a temperature equal to or lower than the sol-gel phase transition temperature.

The gelling agent is not particularly limited with respect to the kind thereof, and is preferably a gelling agent that forms a space three-dimensionally surrounded by plate-like crystals serving as a crystallized product of the gelling agent when crystallized in the ink, and that allows the photocurable compound to be included in the space. Such a structure where the photocurable compound is included in the space three-dimensionally surrounded by the plate-like crystals may be referred to as "card house structure". Once the card house structure is formed, the photocurable compound is kept in the card house structure, and ink droplets are pinned. In other words, ink droplets landed on the recording medium are hardly spread due to wetting, making it possible to form an ink image in a fine pattern shape. In order that ink droplets landed on the recording medium form the card house structure, the photocurable compound and the gelling agent dissolved in the ink are preferably compatible each other. Furthermore, it is important from the viewpoint of stable discharge of ink droplets from an inkjet recording apparatus that compatibility of the photocurable compound and the gelling agent be good in the ink in the form of a gel (at a high temperature).

Examples of such a gelling agent include:

aliphatic ketone compounds;

aliphatic ester compounds;

petroleum waxes such as paraffin wax, microcrystalline wax and petrolatum;

plant waxes such as candelilla wax, carnauba wax, rice wax, sumac wax, jojoba oil, solid jojoba wax and jojoba esters;

animal waxes such as beeswax, lanolin and spermaceti;

mineral waxes such as montan wax and hydrogenated wax;

hydrogenated castor oil or hydrogenated castor oil derivatives;

modified waxes such as montan wax derivatives, paraffin wax derivatives, microcrystalline wax derivatives or polyethylene wax derivatives;

higher fatty acids such as behenic acid, arachidic acid, stearic acid, palmitic acid, myristic acid, lauric acid, oleic acid and erucic acid;

higher alcohols such as stearyl alcohol and behenyl alcohol;

hydroxystearic acids such as 12-hydroxystearic acid;

12-hydroxystearic acid derivatives;

fatty acid amides such as lauric acid amide, stearic acid amide, behenic acid amide, oleic acid amide, erucic acid amide, ricinoleic acid amide and 12-hydroxystearic acid amide (for example, NIKKA AMIDE series produced by Nippon Kasei Chemical Co., Ltd., ITOWAX series produced by Ito Oil Chemicals Co., Ltd., and FATTYAMID series produced by Kao Corporation);

N-substituted fatty acid amides such as N-stearyl stearic acid amide and N-oleyl palmitic acid amide;

specialty fatty acid amides such as N,N'-ethylene bis-stearylamide, N,N'-ethylene bis-12-hydroxystearylamide and N,N'-xylylene bisstearylamide;

higher amines such as dodecylamine, tetradecylamine or octadecylamine;

fatty acid ester compounds such as stearyl stearic acid, oleyl palmitic acid, glycerin fatty acid ester, sorbitan fatty acid ester, propylene glycol fatty acid ester, ethylene glycol fatty acid ester and polyoxyethylene fatty acid ester (for example, EMALLEX series produced by Nihon Emulsion Co., Ltd., RIKEMAL series produced by Riken Vitamin Co., Ltd., and POEM series produced by Riken Vitamin Co., Ltd.);

esters of sucrose fatty acids such as sucrose stearic acid and sucrose palmitic acid (for example, RYOTO Sugar Ester series produced by Mitsubishi-Kagaku Foods Corporation);

synthetic waxes such as polyethylene wax and α-olefin-malic anhydride copolymer wax (UNILIN series produced by Baker-Petrolite, and the like);

dimeric acids;

dimer diols (PRIPOR series produced by CRODA International Plc, and the like);

fatty acid inulins such as inulin stearate;

fatty acid dextrins such as dextrin palmitate and dextrin myristate (RHEOPEARL series produced by Chiba Flour Milling Co., Ltd., and the like);

glyceryl behenate/eicosadioate;

polyglyceryl behenate/eicosadioate (NOMCORT series produced by Nisshin Oillio Group, Ltd., and the like);

amide compounds such as N-lauroyl-L-glutamic acid dibutylamide and N-(2-ethylhexanoyl)-L-glutamic acid dibutylamide (available from Ajinomoto Fine-Techno Co., Inc.);

dibenzylidene sorbitols such as 1,3:2,4-bis-O-benzylidene-D-glucitol (GELOL D available from New Japan Chemical Co., Ltd.); and low molecular weight gelling agents described in Japanese Patent Application Laid-Open No. 2005-126507, Japanese Patent Application Laid-Open No. 2005-255821 and Japanese Patent Application Laid-Open No. 2010-111790.

Here, the gelling agent included in the actinic radiation-curable inkjet ink for use in the foil image forming method of the present embodiment preferably includes a $C_{12}$ or higher linear alkyl structure in the molecule. The $C_{12}$ or higher linear alkyl structure refers to a structure which includes a linear alkyl group and in which the number of carbon atoms included in the linear moiety is 12 or more.

A foil image transferred by a conventional method has the following problems: foil is degraded due to moisture absorbed by an adhesive layer, and the foil cannot sufficiently respond to swelling of the adhesive layer and is cracked. On the contrary, when the gelling agent includes the $C_{12}$ or higher linear alkyl structure, the gelling agent is high in hydrophobicity and thus easily aggregates on the surface of each ink droplet dropped. Therefore, an adhesive layer obtained by curing such ink droplets is easily high in hydrophobicity of the surface thereof, and the adhesive layer hardly absorbs moisture. In other words, a foil image obtained by curing an inkjet ink including the gelling agent is hardly affected by moisture and is hardly degraded for a long period.

In addition, when the gelling agent includes the $C_{12}$ or higher linear alkyl structure in the molecule, the card house structure is easily formed. Specific examples of the gelling agent having such a structure include an aliphatic ketone compound, an aliphatic ester compound, higher fatty acid, higher alcohol and fatty acid amide each having a $C_{12}$ or higher linear alkyl group.

In particular, the gelling agent is preferably an aliphatic ketone represented by general formula (1) below or an aliphatic ester (2) represented by general formula (2) below from the viewpoint that hydrophobicity of an adhesive layer including a cured product of the ink is easily enhanced, or the like.

$$R_1\text{—CO—}R_2 \qquad (1)$$

In general formula (1), $R_1$ and $R_2$ each represent a $C_{1-24}$ linear or branched hydrocarbon group, more preferably represent a $C_{1-24}$ linear hydrocarbon group, further preferably represent a $C_{8-22}$ linear hydrocarbon group, provided that any one of $R_1$ and $R_2$ includes a $C_{12}$ or higher linear alkyl structure and both preferably include a $C_{12}$ or higher linear alkyl structure.

In the aliphatic ketone represented by general formula (1), the number of carbon atoms of the linear alkyl structure is preferably 12 or more and 24 or less. When the number of carbon atoms of the linear alkyl structure is 12 or more, crystallinity of the gelling agent is easily enhanced. Furthermore, the photocurable compound is easily sufficiently included in the card house structure, and a dense ink image is easily formed. On the other hand, when the number of carbon atoms of the linear alkyl structure is 24 or less, the melting point of the gelling agent is not excessively increased, and the gelling agent is sufficiently dissolved in the ink.

Examples of the aliphatic ketone compound represented by general formula (1) include dilignoceryl ketone (C24-C24), dibehenyl ketone (C22-C22, melting point: 88° C.), distearyl ketone (C18-C18, melting point: 84° C.), dieicosyl ketone (C20-C20), dipalmityl ketone (C16-C16, melting point: 80° C.), dimyristyl ketone (C14-C14), dilauryl ketone (C12-C12, melting point: 68° C.), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22) and stearyl behenyl ketone (C18-C22).

Examples of a commercial product of the compound represented by general formula (1) include 18-Pentatriacontanon (produced by Alfa Aeser), Hentriacontan-16-on (produced by Alfa Aeser) and KAO wax T1 (produced by Kao Corporation).

The aliphatic ketone represented by general formula (1) may be included singly or in combination of two or more in the actinic radiation-curable inkjet ink.

In general formula (2), $R_3$ represents a $C_{1-24}$ linear or branched hydrocarbon group, more preferably represents a $C_{1-24}$ linear hydrocarbon group, further preferably represents a $C_{8-22}$ linear hydrocarbon group, and on the other hand, $R_4$ represents a hydrogen atom or a $C_{1-24}$ linear or branched hydrocarbon group, more preferably represents a $C_{1-24}$ linear hydrocarbon group, further preferably represents a $C_{8-22}$ linear hydrocarbon group, provided that any one of $R_3$ and $R_4$ includes a $C_{12}$ or higher linear alkyl structure and both preferably include a $C_{12}$ or higher linear alkyl structure.

In general formula (2), the number of carbon atoms of the linear alkyl structure is preferably 12 or more and 24 or less. When the number of carbon atoms of the linear alkyl structure is 12 or more, crystallinity of the gelling agent is easily enhanced. Furthermore, the photocurable compound is easily sufficiently included in the card house structure, and the ink image is easily formed in a dense pattern. On the other hand, when the number of carbon atoms of the linear alkyl structure is 24 or less, the melting point of the gelling agent is not excessively increased, and the gelling agent is sufficiently dissolved in the ink.

Examples of the fatty acid or the aliphatic ester represented by general formula (2) include behenic acid, behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.), cetyl myristate (C13-C16, melting point: 50° C.), octyldodecyl myristate (C13-C20), stearyl oleate (C17-C18), stearyl erucate (C21-C18), stearyl linoleate (C17-C18), behenyl oleate (C18-C22), myricyl cerotate (C25-C16), stearyl montanate (C27-C18), behenyl montanate (C27-C22), arachidyl linoleate (C17-C20) and palmityl triacontanate (C29-C16).

Examples of a commercial product of the aliphatic ester represented by general formula (2) include UNISTAR M-2222SL (produced by NOF Corporation), EXCEPARL SS (produced by Kao Corporation, melting point: 60° C.), EMALEX CC-18 (produced by Nihon Emulsion Co., Ltd.), AMREPS PC (produced by Kokyu Alcohol Kogyo Co., Ltd.), EXCEPARL MY-M (produced by Kao Corporation), SPERMACETI (produced by NOF Corporation) and EMALEX CC-10 (produced by Nihon Emulsion Co., Ltd.). Such a commercial product is often a mixture of two or more, and may be therefore separated and purified, if necessary.

The fatty acid or the aliphatic ester compound may be included singly or in combination of two or more in the actinic radiation-curable inkjet ink.

The amount of the gelling agent included in the actinic radiation-curable inkjet ink is 0.5 to 10.0 mass %, preferably 1 to 7 mass % based on the total amount of the ink. If the amount is less than 0.5 mass %, ink droplets cannot undergo gelation (sol-gel phase transition depending on the temperature), and if the amount is more than 10 mass %, the gelling agent cannot be sufficiently dissolved in the ink, and ejection property of the ink droplet is deteriorated.

Photocurable Compound

The photocurable compound is a compound to be crosslinked or polymerized by irradiation with an actinic radiation. The actinic radiation is, for example, an electron beam, ultraviolet light, an α-ray, a γ-ray and an X-ray, and is preferably ultraviolet light. The photocurable compound is a radical polymerizable compound or a cationic polymerizable compound, and is preferably a radical polymerizable compound.

The radical polymerizable compound can be a compound (a monomer, an oligomer, a polymer, or a mixture thereof) having a radical polymerizable ethylenically unsaturated bond. The radical polymerizable compound may be included singly or in combination of two or more in the actinic radiation-curable inkjet ink.

Examples of the compound having a radical polymerizable ethylenically unsaturated bond include unsaturated carboxylic acid and salts thereof, an unsaturated carboxylic acid ester compound, an unsaturated carboxylic acid urethane compound, an unsaturated carboxylic acid amide compound and anhydrides thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid and maleic acid.

The radical polymerizable compound is more preferably an unsaturated carboxylic acid ester compound, more preferably a (meth)acrylate compound. The (meth)acrylate compound is not only a monomer, but also an oligomer, a mixture of a monomer and an oligomer, a modified product, an oligomer having a polymerizable functional group, or the like. The "(meth)acrylate" refers to both or any one of "acrylate" and "methacrylate", and the "(meth)acrylic" refers to both or any one of "acrylic" and "methacrylic".

The molecular weight of the (meth)acrylate compound is preferably in the range from 280 to 1500, more preferably in the range from 300 to 800. In order that ink droplets are stably discharged from an inkjet recording head, the viscosity of the ink at the discharge temperature is required to be generally between 7 mPa·s and 14 mPa·s. An ink including a (meth)acrylate compound having a molecular weight of 280 or more, and the gelling agent is small in the change of viscosity of the ink at about the discharge temperature, and thus the viscosity of the ink is easily adjusted within the range. In addition, the (meth)acrylate compound having a molecular weight of 280 or more has few odors, and therefore the actinic radiation-curable inkjet ink and the cured product thereof have few odors. On the other hand, the molecular weight is 1500 or less to thereby allow the sol viscosity of the ink to be easily within a desired range.

The (meth)acrylate compound is preferably (1) a tri- or higher functional methacrylate or acrylate compound having 3 to 14 structures each represented by (—C(CH$_3$)H—CH$_2$—O—) in the molecule, or (2) a di- or higher functional methacrylate or acrylate compound having a cyclic structure in the molecule. Such a (meth)acrylate compound is high in photocurability, and is less shrunk when cured. Furthermore, such a compound is high in repeated producibility of sol-gel phase transition.

The tri- or higher functional methacrylate or acrylate compound (1) having 3 to 14 structures represented by (—C(CH$_3$)H—CH$_2$—O—) in the molecule is obtained by, for example, modifying a hydroxyl group of a compound having three or more hydroxyl groups with propylene oxide, and esterifying the resulting modified product with (meth) acrylic acid. Specific examples of the compound include 3PO-modified trimethylolpropane triacrylate Photomer 4072 (molecular weight: 471, produced by Cognis) and 3PO-modified trimethylolpropane triacrylate Miramer M360 (molecular weight: 471, produced by Miwon Specialty Chemical Co., Ltd.).

The di- or higher functional methacrylate or acrylate compound (2) having a cyclic structure in the molecule can be obtained by, for example, esterifying a hydroxyl group of a compound having two or more hydroxyl groups and tricycloalkane with (meth)acrylic acid. Specific examples of the compound include tricyclodecane dimethanol diacrylate NK Ester A-DCP (molecular weight: 304) and tricyclodecane dimethanol dimethacrylate NK Ester DCP (molecular weight: 332).

On the other hand, the photocurable compound can also be a (meth)acrylate compound other than the above. Examples of the (meth)acrylate compound other than the above include 1,10-decanedioldimethacrylate NK Ester DOD-N (molecular weight: 310, produced by Shin-Nakamura Chemical Co., Ltd.), 4EO-modified hexanediol diacrylate (CD561 produced by Sartomer, molecular weight: 358); 3EO-modified trimethylolpropane triacrylate (SR454 produced by Sartomer, molecular weight: 429); 4EO-modified pentaerythritol tetraacrylate (SR494 produced by Sartomer, molecular weight: 528); 6EO-modified trimethylolpropane triacrylate (SR499 produced by Sartomer, molecular weight: 560); caprolactone acrylate (SR495B produced by Sartomer); polyethylene glycol diacrylates (NK Ester A-400, produced by Shin-Nakamura Chemical Co., Ltd., molecular weight: 508), and (NK Ester A-600, produced by Shin-Nakamura Chemical Co., Ltd., molecular weight: 708); polyethylene glycol dimethacrylates (NK Ester 9G, produced by Shin-Nakamura Chemical Co., Ltd., molecular weight: 536), and (NK Ester 14G, produced by Shin-Nakamura Chemical Co., Ltd.); tetraethylene glycol diacrylate (V#335HP produced by Osaka Organic Chemical Industry Ltd., molecular weight: 302); stearyl acrylate (STA produced by Osaka Organic Chemical Industry Ltd.); phenol EO-modified acrylate (M144 produced by Miwon Specialty Chemical Co., Ltd.); and nonylphenol EO-modified acrylate (M166 produced by Miwon Specialty Chemical Co., Ltd.).

The photocurable compound can also be a polymerizable oligomer other than an unsaturated carboxylic acid ester compound. Examples of the polymerizable oligomer include epoxy acrylate, aliphatic urethane acrylate, aromatic urethane acrylate, polyester acrylate and a linear acrylic oligomer.

The amount of the photocurable compound included in the actinic radiation-curable inkjet ink is preferably 10 to 40 mass % based on the total mass of the ink. If the amount of the photocurable compound is 10 mass % or more, solubility of the gelling agent may be deteriorated not to allow sol-gel phase transition to be sufficiently undergone. On the other hand, if the amount of the photocurable compound is more than 40 mass %, solubility of the photopolymerization initiator in the ink may be insufficient. Consequently, the ink may be unstably discharged from an inkjet recording apparatus, and/or ink droplets may be largely shrunk when cured, resulting in wrinkles and the like in a foil image.

Photopolymerization Initiator

The photopolymerization initiator is further included in the actinic radiation-curable inkjet ink. The photopolymerization initiator is classified to intramolecular bond cleaving type and intramolecular hydrogen withdrawing type photopolymerization initiators.

Examples of the intramolecular bond cleaving type photopolymerization initiator include acetophenones such as diethoxyacetophenone, 2-hydroxy-2-methyl-1-phenylpropane-1-one, benzil dimethylketal, 1-(4-isopropylphenyl)-2-hydroxy-2-methylpropane-1-one, 4-(2-hydroxyethoxy)phenyl-(2-hydroxy-2-propyl)ketone, 1-hydroxycyclohexylphenyl ketone, 2-methyl-2-morpholino(4-thiomethylphenyl)propane-1-one and 2-benzyl-2-dimethylamino-1-(4-morpholinophenyl)-butanone; benzoins such as benzoin, benzoin methyl ether and benzoin isopropyl ether; acyl phosphine oxides such as 2,4,6-trimethylbenzoin diphenylphosphine oxide; and benzil and methyl phenyl glyoxy ester.

Examples of the intramolecular hydrogen withdrawing type photopolymerization initiator include benzophenones such as benzophenone, methyl o-benzoyl benzoate-4-phenyl benzophenone, 4,4'-dichlorobenzophenone, hydroxybenzophenone, 4-benzoyl-4'-methyl-diphenylsulfide, acrylic benzophenone, 3,3',4,4'-tetra(t-butylperoxycarbonyl)benzophenone and 3,3'-dimethyl-4-methoxybenzophenone; thioxanthones such as 2-isopropylthioxanthone, 2,4-dimethylthioxanthone, 2,4-diethylthioxanthone and 2,4-dichlorothioxanthone; aminobenzophenones such as Michler's ketone and 4,4'-diethylaminobenzophenone; 10-butyl-2-chloroacridone, 2-ethylanthraquinone, 9,10-phenanthrenequinone and camphorquinone.

The photopolymerization initiator has good sensitivity when is an acylphosphine oxide or acyl phosphonate. Specifically, bis(2,4,6-trimethylbenzoyl)-phenyl phosphine oxide, bis(2,6-dimethoxybenzoyl)-2,4,4-trimethyl-pentylphosphine oxide, and the like are preferable.

The content of the photopolymerization initiator in the actinic radiation-curable inkjet ink is preferably 0.1 mass % to 10 mass %, more preferably 2 to 8 mass % depending on the light for irradiation in curing of the ink, the kind of the photocurable compound, and the like.

The actinic radiation-curable inkjet ink may include a photo-acid generator, if necessary. Examples of the photo-acid generator include a compound for use in a chemically amplified photoresist and/or photocationic polymerization (see, "Organic Materials for Imaging", in pages 187 to 192, edited by The Japanese Research Association for Organic Electronics Materials and published by Bunshin-Publishing (1993)).

The actinic radiation-curable inkjet ink may further include a photopolymerization initiator aid, a polymerization inhibitor, and the like, if necessary. The photopolymerization initiator aid may be a tertiary amine compound, and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxyethylaniline, triethylamine and N,N-dimethylhexylamine. In particular, N,N-dimethylamino-p-benzoic acid ethyl ester and N,N-dimethylamino-p-benzoic acid isoamyl ethyl ester are preferable. Such a compound may be included singly or in combination of two or more in the actinic radiation-curable inkjet ink.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, Cupferron, aluminum N-nitrosophenylhydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime and cyclohexanone oxime.

Non-Polymerizable Resin

The actinic radiation-curable inkjet ink may include, if necessary, a resin inactive to an actinic radiation; namely, a non-polymerizable resin not having a group (photocurable group) to be crosslinked or polymerized by irradiation with an actinic radiation.

Examples of the non-polymerizable resin included in the actinic radiation-curable inkjet ink include a polyester resin or a ketone resin having at least one polar functional group in the molecule. The actinic radiation-curable inkjet ink includes such a polyester resin or ketone resin to thereby allow the gelling agent to be easily precipitated on the droplet surface due to the polar functional group after landing of the ink on the recording medium. On the other hand, a moiety (ester moiety or ketone moiety) having a relatively low polarity of the polyester resin or the ketone resin has affinity with the gelling agent. In other words, the gelling agent is easily uniformly mixed in the ink in the form of a sol. Furthermore, the polar functional group of the polyester resin or the ketone resin is bound to the functional group on the surface of the recording medium or a metal included in the foil layer to thereby enhance adhesion property of an adhesive layer obtained by curing of the ink to the recording medium, and adhesion property of the adhesive layer to the foil layer.

The polar functional group included in the polyester resin or the ketone resin is preferably a group selected from the group consisting of a —OH group, a —COOH group, a —NH$_2$ group, a —NO$_2$ group and a —CN group. The polyester resin or the ketone resin has such a polar functional group to thereby allow the gelling agent to be easily precipitated on the surface after landing of the ink on the recording medium. In particular, the polyester resin or the ketone resin preferably has both a —OH group and —COOH. When the polyester resin or the ketone resin has such groups, adhesion property is easily enhanced even if any functional group is present on the surface of the recording medium.

The amount of the polar functional group included in the polyester resin or the ketone resin is not particularly limited, and the amount is preferably within a range so that the acid value or the base value of the polyester resin or the ketone resin is 10 to 350 mgKOH/g. The acid value or the base value of the polyester resin or the ketone resin is more preferably 10 to 65 mgKOH/g. If the acid value or the base value of the polyester resin or the ketone resin is 10 mgKOH/g, adhesion property of the adhesive layer to the recording medium and/or the foil layer is not sufficiently enhanced, and furthermore the ink does not sufficiently undergo sol-gel phase transition. On the other hand, if the acid value or the base value of the polyester resin or the ketone resin is more than 350 mgKOH/g, it is more difficult to introduce the polar functional group to the polyester resin or the ketone resin. In addition, if the amount of the polar functional group is excessive, compatibility of the gelling agent in the ink in the form of a sol may be deteriorated. The acid value and the base value are measured according to the neutralization value test method described in JIS K2501.

The number average molecular weight of the polyester resin or the ketone resin having a polar functional group is preferably 1,000 to 5,000, more preferably 1,200 to 3,000. If the number average molecular weight of the polyester resin or the ketone resin is less than 1,000, compatibility of the gelling agent is increased to make it difficult to precipitate the gelling agent. On the other hand, if the number average molecular weight of the polyester resin or the ketone resin is more than 5,000, the viscosity of the actinic radiation-curable inkjet ink is increased to result in deterioration in discharge stability of the ink from an inkjet recording apparatus. The number average molecular weight is a value in terms of polystyrene by gel permeation chromatography (GPC).

Specific examples of the polyester resin having a hydroxyl group include specialty ester resins (TEGO AddBond series (LTH, LTW, 1270, 2440, 3350UV), all having an average molecular weight of 1,500 to 3,000, an acid value of 15 to 65 mgKOH/g, and a base value of 10 to 50 mgKOH/g) produced by EVONIK INDUSTRIES.

Specific examples of the ketone resin having a hydroxyl group include a ketone resin (TEGO VARIPLUS SK (average molecular weight: 1,000 to 2,000; acid value about: 0 mgKOH/g; base value about: 300 mgKOH/g)) produced by Degussa AG.

Specific examples of the ketone resin having a urethane group include a ketone resin (TEGO VARIPLUS PZZ-1201) produced by Degussa AG.

The amount of the polyester resin or the ketone resin having a polar functional group included in the actinic radiation-curable inkjet is 1.0 to 15.0 mass %, preferably 3.0 to 10.0 mass % based on the total mass of the ink. When two or more of the polyester resins or the ketone resins having a polar functional group are included, the total amount thereof is within the range. If the amount of the polyester resin or the ketone resin having a polar functional group is less than 2.0 mass %, the gelling agent may not be sufficiently precipitated (crystallized) in the ink landed. On the other hand, if the amount of the polyester resin or the ketone resin having a polar functional group is more than 15.0 mass %, not only the viscosity of the ink in the form of a sol is increased, but also solubility of the gelling agent in the ink in the form of a sol is decreased.

The method for preparing the polyester resin having a polar functional group is not particularly limited. For example, the polyester resin is prepared from polyhydric alcohol, polyvalent carboxylic acid, cyclic lactone or the like having a polar functional group. Specifically, the polyester resin having a polar functional group can be prepared by conducting the following reaction(s):

(i) a direct esterification reaction of di- or higher functional polyhydric alcohol and di- or higher functional polyvalent carboxylic acid;
(ii) a transesterification reaction of di- or higher functional polyester and di- or higher functional polyhydric alcohol;
(iii) an esterification reaction of di- or higher functional polyhydric alcohol and acid anhydride;
(iv) a direct esterification reaction of hydroxycarboxylic acid having at least one hydroxy group and at least one carboxyl group in one molecule; and
(v) ring-opening polymerization of cyclic lactone where a polar functional group is bound to a ring.

The acid value and the base value of the polyester resin are adjusted by the amount of functional group(s) of polyhydric alcohol, polyvalent carboxylic acid, hydroxycarboxylic acid, polar group-containing cyclic lactone, and the like as raw materials.

The ketone resin having a polar functional group can be prepared by reacting a compound having a polar functional group with an aromatic ketone compound such as acetophenone. For example, a ketone resin having a —OH group can be prepared by reacting an aldehyde compound such as formaldehyde with an aromatic ketone compound such as acetophenone, and hydrogenating the resulting ketone resin.

The acid value and the base value of the ketone resin are adjusted by the amount of a compound to be reacted with a ketone compound, the kind of the compound, and the like.

Other Component(s)

The actinic radiation-curable inkjet ink may further include, if necessary, other component(s). Such other component(s) can be a colorant, various additives, other resin, and the like. Examples of such additives include a dispersion aid, a surfactant, a leveling additive, a matting agent, an ultraviolet absorber, an infrared absorber, an antimicrobial agent, and a basic compound for enhancement in storage stability of the ink. Examples of the basic compound include a basic alkali metal compound, a basic alkali earth metal compound, and a basic organic compound such as amine. Other resin includes a resin for adjustment of physical properties of a cured product of the ink, namely, an adhesive layer, and examples include a polyester-based resin, a polyurethane-based resin, a vinyl resin, an acrylic resin, a rubber resin and waxes.

Method for Preparing Inkjet Ink

The actinic radiation-curable inkjet ink is obtained by mixing the gelling agent, the photocurable compound, a photo-initiator, the non-polymerizable resin, and the like according to a known method, under heating.

(Formation of Ink Image)

Formation of the ink image is performed by dropping the actinic radiation-curable inkjet ink by an inkjet recording apparatus. In order that ejection property of ink droplets is here enhanced, the ink temperature in the inkjet recording head is preferably set at a temperature higher than the sol-gel phase transition temperature of the ink by 10 to 30° C. If the ink temperature in the inkjet recording head is a temperature higher than the sol-gel phase transition temperature by less than 10° C., the ink undergoes gelation in the inkjet recording head or on the surface of a nozzle, easily resulting in deterioration in ejection property of ink droplets. On the other hand, if the ink temperature in the inkjet recording head is a temperature higher than the sol-gel phase transition temperature by more than 30° C., the ink is heated to a so high temperature that the ink component may be degraded.

The amount of one droplet to be discharged from each nozzle of the inkjet recording head is, while depending on the resolution of the foil image, preferably 0.5 to 10 pl, and is more preferably 0.5 to 2.5 pl in order to form a high-definition foil image.

On the other hand, the temperature of the recording medium in application of the actinic radiation-curable inkjet ink is set at a temperature lower than the sol-gel phase transition temperature of the ink by 30° C. or more. The temperature of the recording medium is preferably a temperature lower than the sol-gel phase transition temperature of the ink by 30 to 70° C., particularly preferably a temperature lower than the phase transition temperature by 30 to 50° C. Thus, ink droplets landed on the recording medium rapidly undergo gelation to form the ink image in a desired pattern. The temperature of the recording medium refers to the surface temperature of the recording medium on which the ink is to be landed, and the entire recording medium may not be necessarily at the temperature. The surface temperature of the recording medium is measured by an infrared thermometer or the like.

The temperature of the recording medium is adjusted by warming or cooling the recording medium by a known procedure. The warming method and the cooling method are not particularly limited, and can be performed by various heaters, chillers, Peltier elements, and the like.

The average thickness of the ink image to be formed in the present operation is usually preferably about 0.1 to 1,000 μm, more preferably about 1 to 300 μm. When the thickness of the ink image is 1 μm or more, the adhesion strength of a foil layer of a transfer foil to the ink image in foil layer formation described later is easily sufficiently increased. The average thickness is measured by observation of the cross section of the ink image with SEM.

(1.2) Foil Layer Formation

The ink image formed from ink droplets of the actinic radiation-curable inkjet ink applied in the ink image formation is brought into contact with a transfer surface of transfer foil including a foil layer, and pressure bonded. The transfer foil is then peeled to thereby transfer the foil layer only onto the ink image.

The transfer foil to be brought into contact with the adhesive layer includes, for example, at least support material 4 and foil layer 5, as illustrated in FIG. 2B, and, for example, a release layer (not illustrated) may be formed between support material 4 and foil layer 5. Alternatively, the adhesive layer and the like may be formed on the transfer surface of the transfer foil. Alternatively, a colored layer (not illustrated) for coloration of foil layer 5, and the like may be included between foil layer 5 and support material 4. In such a case, the colored layer is also transferred, together with foil layer 5, onto ink image 2. Such transfer foil 3 may be a single sheet, or a long sheet wound up in the form of a roll.

Foil layer 5 included in transfer foil 3 is a layer that imparts on a substrate a character, a picture and the like having metal feeling and gloss feeling which are difficult to express by general printing, or a watermarked character, a watermarked picture and the like having transparency. Foil layer 5 can be, for example, metal foil, a metal-deposited film, a hologram film, a pearl toned film, a rainbow-color film, a monochrome film, a color film or a clear film. The foil can also be a layer including a composite material of a plastic film and a metal for the purpose of enhancement in strength. Foil layer 5 can also be a layer where a regular pattern is imparted on a metal film by a known processing method such as water-washing celite processing, etching processing or laser processing. The thickness of foil layer 5 is appropriately selected depending on the kind of the foil layer, and is usually about 10 to 100 nm.

On the other hand, support material 4 included in transfer foil 3 may be a member that can support foil layer 5, and includes, for example, a film or a sheet made of a resin having flexibility or the like, or a paper sheet. Examples of the resin that forms support material 4 include known resins such as a polyethylene terephthalate (PET) resin, a polyethylene naphthalate (PEN) resin, a polypropylene (PP) resin, a polyethersulfone resin and a polyimide resin. Support material 4 may have a monolayer structure or a multilayer structure.

As described above, transfer foil 3 may include a release layer (not illustrated). The release layer is a layer that ensures peeling property of foil layer 5 from support material 4. The release layer can be, for example, a layer including a thermosetting resin where melamine or isocyanate is used as a curing agent, or a layer including known wax such as a fluorine-based or silicon-based monomer or polymer.

Transfer foil 3 may also further include an adhesive layer (not illustrated). The adhesive layer can be a layer that exhibits adhesiveness to the ink image by heating, or the like. The adhesive layer can be, for example, a layer including a thermosensitive adhesive so-called a hot-melt type adhesive. Examples of the thermosensitive adhesive include adhesives including an acrylic resin, a vinyl chloride-vinyl acetate copolymer, an epoxy resin, an ethylene-vinyl alcohol copolymer, and the like.

Figure 3:
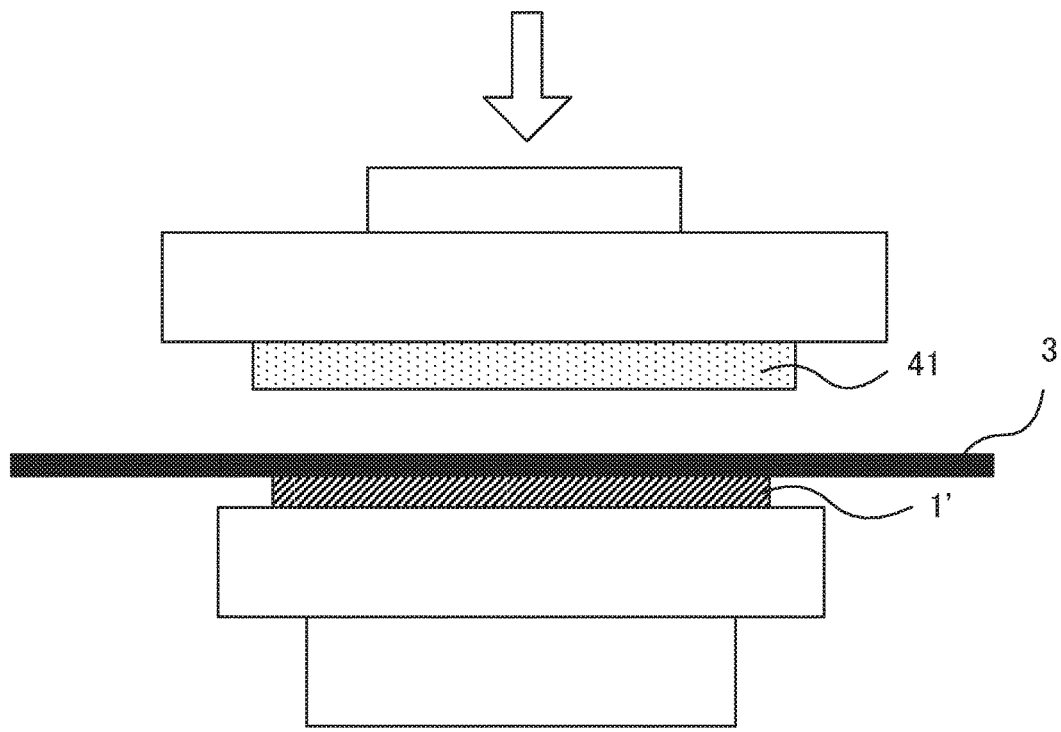
FIG. 3 illustrates a view for describing a method of pressure bonding foil and an ink image in the foil image forming method of Embodiment 2 of the present invention.
Figure 4:
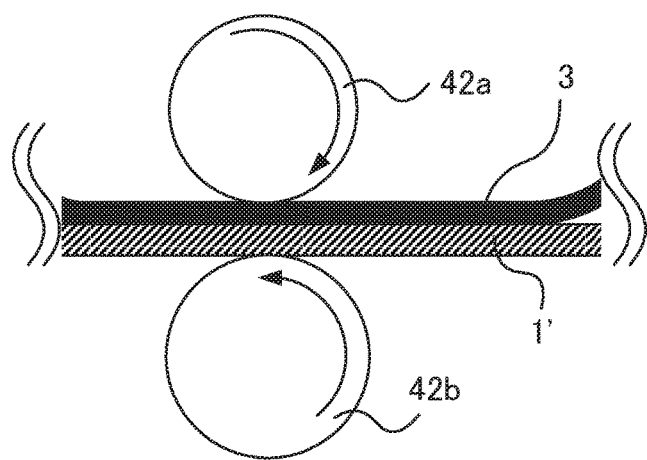
FIG. 4 illustrates a view for describing a method of pressure bonding foil and an ink image in the foil image forming method of Embodiment 2 of the present invention.
Figure 5:
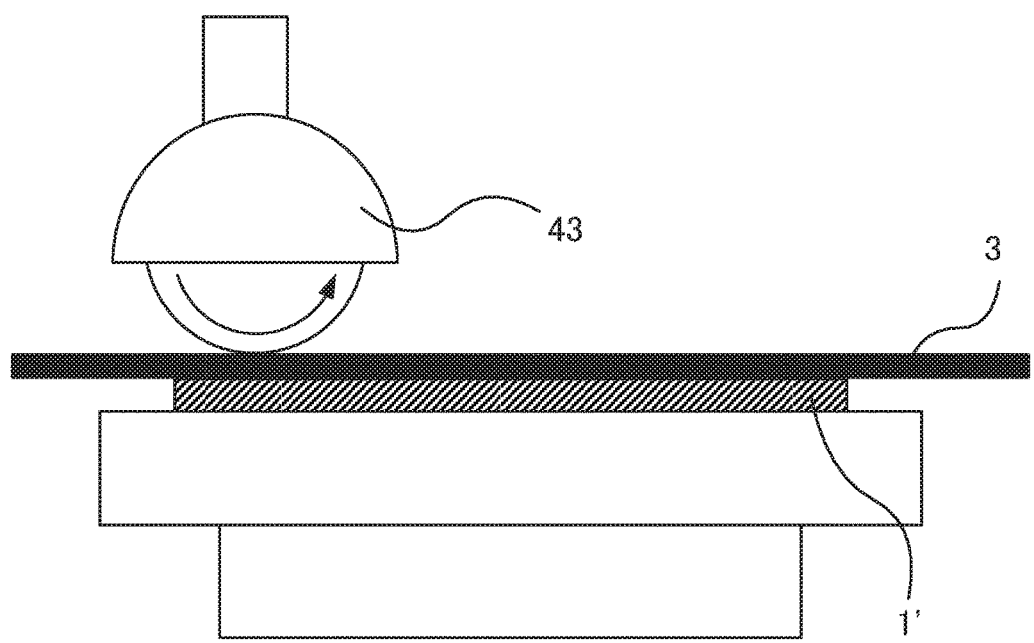
FIG. 5 illustrates a view for describing a method of pressure bonding foil and an ink image in the foil image forming method of Embodiment 2 of the present invention.

In the present operation, ink image 2 and the transfer surface (surface opposite to support material 4) of transfer foil 3 are pressure bonded with being in contact with each other. The method for pressure bonding transfer foil 3 and recording medium 1' on which the ink image is formed is not particularly limited. For example, as illustrated in FIG. 3, a method may also be adopted in which plate 41 having a plate shape or desired shape is pressed while recording medium 1' on which an ink image (not illustrated) is formed and transfer foil 3 are laminated. As illustrated in FIG. 4, a method may also be adopted in which transfer foil 3 and recording medium 1' on which an ink image (not illustrated) is formed are allowed to pass between a pair of transfer rolls 42a and 42b while being laminated. Furthermore, as illustrated in FIG. 5, a method may also be adopted in which pressure is applied to the support material of transfer foil 3, or recording medium 1' by transfer roll 43 or the like.

The force for pressure bonding of ink image 2 and transfer foil 3 (pressure bonding force) is preferably 100 to 800 kPa, more preferably 200 to 600 kPa in terms of the nip surface pressure. In addition, the pressure bonding time is preferably 0.1 to 30 seconds, more preferably 0.5 to 10 seconds.

Ink image 2 and transfer foil 3 may also be here pressure bonded with being heated. Such heating can be conducted by heating, for example, a transfer roll or a plate. The heating temperature is here preferably 30 to 90° C., more preferably 40 to 60° C. Such heating can be performed to thereby allow foil layer 5 to be peeled from transfer foil 3, transferring foil layer 5 in a short time. If the heating temperature is excessively high, however, the ink that forms ink image 2 may be softened to cause pattern collapse. Accordingly, the heating temperature is preferably within the above range.

After transfer foil 3 and ink image 2 are pressure bonded, transfer foil 3 is separated from recording medium 1. Foil layer 5 pressure bonded to ink image 2 here remains on ink image 2. On the other hand, a region of foil layer 5, in no contact with ink image 2, is removed together with the support material. In other words, a foil image (foil layer 5') is formed on recording medium 1 in the same pattern as that of ink image 2.

(1.3) Ink Image Curing

After the foil layer formation, ink image 2 located between recording medium 1 and foil layer 5 is irradiated with an actinic radiation to crosslink or polymerize the photocurable compound included in the actinic radiation-curable inkjet ink (ink image 2) to be cured. Thus, foil layer 5 is fixed on recording medium 1.

The method for irradiating ink image 2 with light is not particularly limited, and ink image 2 may be irradiated with an actinic radiation from above foil layer 5. When recording medium 1 has transparency to an actinic radiation, ink image 2 may be irradiated with an actinic radiation via recording medium 1.

The actinic radiation for use in the irradiation is not particularly limited, and is appropriately selected depending on the kind of the photopolymerization initiator included in the actinic radiation-curable inkjet ink. The actinic radiation can be, for example, an electron beam, ultraviolet light, an α-ray, a γ-ray or an X-ray, and is preferably ultraviolet light, particularly preferably ultraviolet light from an LED light source. Examples of the LED apparatus that can radiate ultraviolet light include a water-cooling LED (395 nm) manufactured by Phoseon Technology.

While the ultraviolet light source is generally a metal halide lamp, an LED light source can decrease radiation heat from the light source. In other words, the following or the like can be suppressed: the viscosity of the ink is reduced due to radiation heat to cause the shape of ink image 2 to be changed. As a result, foil layer 5' is sufficiently fixed by adhesive layer 2' including a cured product of ink image 2.

The peak illuminance (peak illuminance of ultraviolet light at 370 to 410 nm) of the actinic radiation on the surface of the ink image is preferably 0.5 to 10 W/cm$^2$, more preferably 1 to 5 W/cm$^2$ from the viewpoints that application of radiation heat is suppressed and the ink is sufficiently cured. The dose of the actinic radiation for irradiation of the ink is preferably less than 350 mJ/cm$^2$.

A laminated article to be obtained by the foil image forming method of the present embodiment includes, as illustrated in FIG. 2D, recording medium 1, adhesive layer 2' (a cured product of the actinic radiation-curable inkjet ink) formed on the recording medium in a pattern shape, and foil layer 5' formed on adhesive layer 2'. In the laminated article, not only foil layer 5' is firmly bonded by adhesive layer 2', but also adhesive layer 2' hardly absorbs moisture. Accordingly, foil layer 5' is hardly affected by moisture and hardly degraded over time.

The foil image forming method of the present embodiment can be applied for formation of a foil image on various products; and, for example, can be applied for production of decoration wallpaper, packaging materials, books, stationery, machines, equipment, electrical appliances, cloths, fabrics, and paintings.

2-2. Foil Image Forming Apparatus

The respective operations of the foil image forming method may be performed by different apparatuses. On the other hand, foil image forming apparatus 200 illustrated in FIG. 6 can singly perform all the operations. One example of the foil image forming apparatus is described below, but the foil image forming apparatus is not limited to the following embodiment.

Figure 6:
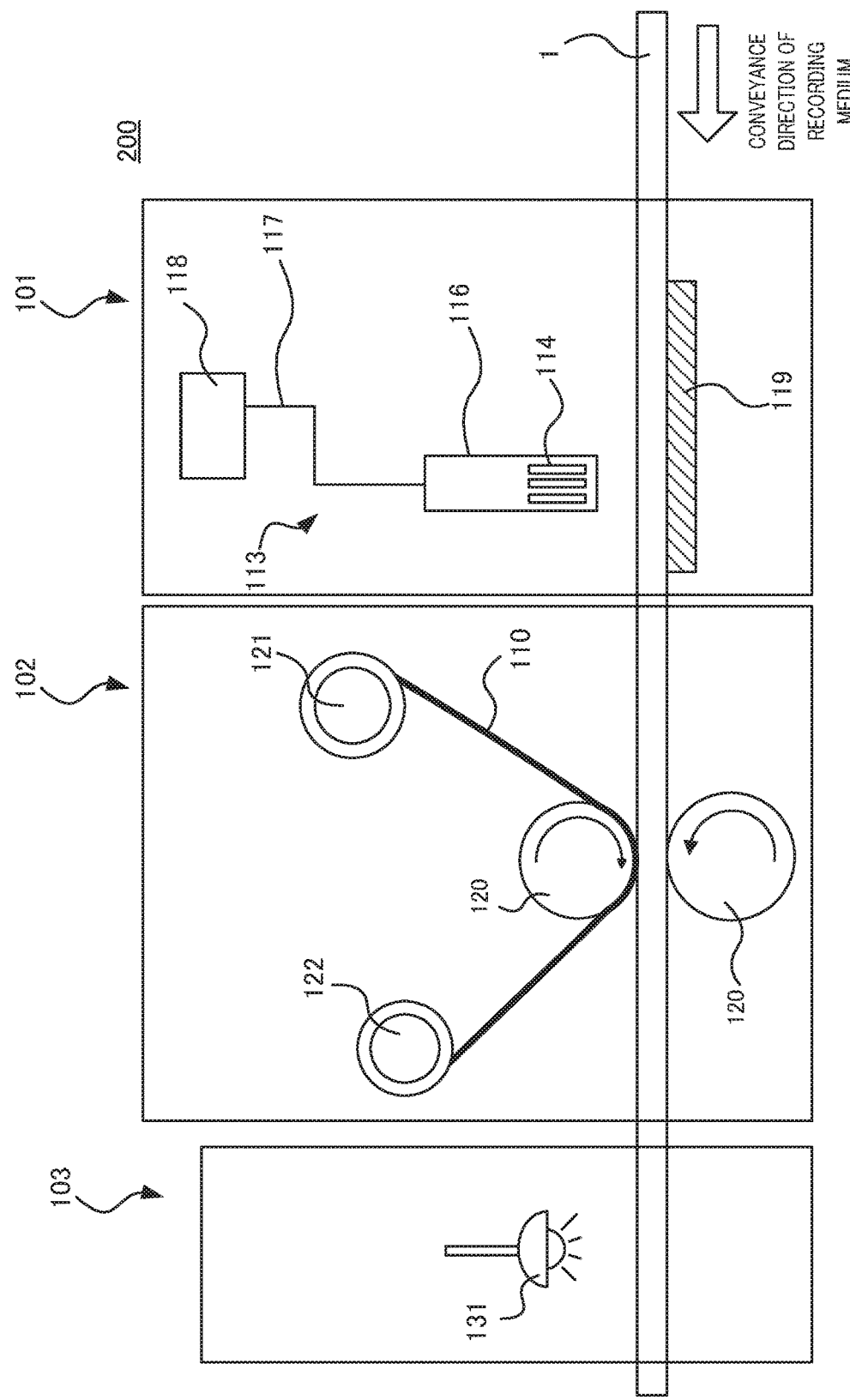
FIG. 6 includes a schematic cross-sectional view illustrating one example of a foil image forming apparatus that performs the foil image forming method of Embodiment 2 of the present invention.

As illustrated in FIG. 6, foil image forming apparatus 200 includes ink application unit 101 that forms an ink image, foil transfer unit 102 that transfers a foil layer of transfer foil, and actinic radiation irradiation unit 103 that cures the ink image. In the foil image forming apparatus, the ink image formation is performed in ink application unit 101, and the foil layer formation is performed in foil transfer unit 102. In addition, the ink image curing is performed in actinic radiation irradiation unit 103.

Figure 7:
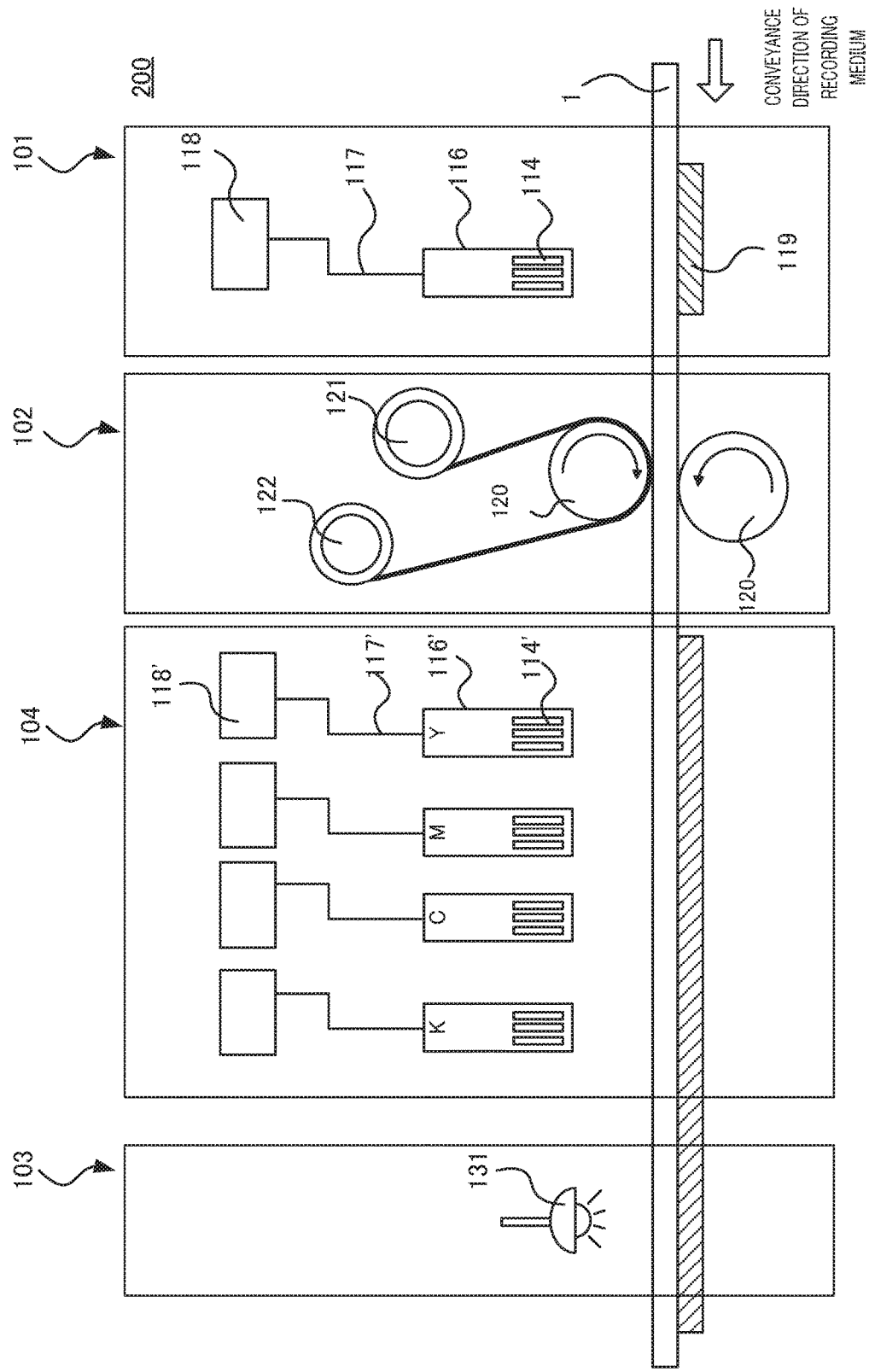
FIG. 7 includes a schematic cross-sectional view illustrating another example of the foil image forming apparatus that performs the foil image forming method of Embodiment 2 of the present invention.

Foil image forming apparatus 200 may further include image forming unit 104 that forms an image other than the foil image or that colors the foil image, as illustrated in FIG. 7.

(Ink Application Unit)

The ink application unit for use in application of the actinic radiation-curable inkjet ink includes inkjet recording section 113 for use in application of the actinic radiation-curable inkjet ink, and temperature control section 119 that controls the temperature of recording medium 1.

Inkjet recording section 113 may be line recording (single-path recording) means or serial recording means. Such sections may be selected depending on the resolution and the recording rate of the ink image, to be demanded, and is preferably line recording (single-path recording) means from the viewpoint of high-rate recording. Hereinafter, an example of line recording (single-path recording) inkjet recording section 113 is described, but inkjet recording section 113 is not limited to such an example.

Inkjet recording section 113 includes head carriage 116 that accommodates a plurality of inkjet recording heads 114, ink passage 117 connected to head carriage 116, and ink tank 118 that stores the ink to be supplied through ink passage 117.

Ink tank 118 is connected to head carriage 116 via ink passage 117. Ink passage 117 is a passage that supplies the ink in ink tank 118 to head carriage 116.

Head carriage 116 is secured and disposed so as to cover the entire width of recording medium 1, and a plurality of inkjet recording heads 114 are accommodated therein. The actinic radiation-curable inkjet ink is supplied to inkjet recording heads 114.

A plurality of inkjet recording heads 114 are disposed in the conveyance direction of recording medium 1, and the number of inkjet recording heads 114 to be disposed in the conveyance direction of recording medium 1 is set depending on the nozzle density of each of inkjet recording heads 114 and the resolution of an image printed. For example, when inkjet recording heads 114 having an amount of droplets of 2 pl and a nozzle density of 360 dpi are used to form an image having a resolution of 1440 dpi, four inkjet recording heads 114 are disposed in the conveyance direction of recording medium 1 with being shifted. When inkjet recording heads 114 having an amount of droplets of 6 pl and a nozzle density of 360 dpi are used to form an image having a resolution of 720×720 dpi, two inkjet recording heads 114 are disposed with being shifted. The unit "dpi" represents the number of ink droplets (dots) per 2.54 cm.

A temperature adjustment section (not illustrated) is provided for the ink in each of ink tank 118, ink passage 117, head carriage 116 and inkjet recording head 114, and the temperature is managed in the section so that the actinic radiation-curable inkjet ink is in the form of a sol.

On the other hand, temperature control section 119 is disposed so as to cover the entire width of recording medium 1. Temperature control section 119 includes a temperature detection section (not illustrated) that detects the surface temperature of recording medium 1, and a temperature adjustment section (not illustrated) such as a heater and a chiller. While temperature control section 119 is disposed on the lower surface of recording medium 1 in foil image forming apparatus 200 illustrated in FIG. 6, temperature control section 119 is disposed at any location of ink application unit 101 depending on the thickness, the shape and the like of recording medium 1.

In ink application unit 101, recording medium 1 is conveyed between head carriage 116 of inkjet recording section 113 and temperature control section 119. The temperature of recording medium 1 is then adjusted to a temperature lower than the sol-gel phase transition temperature of the actinic radiation-curable inkjet ink by 30° C. or more by temperature control section 119. Next, ink droplets at high temperatures are discharged through inkjet recording heads 114 of head carriage 116, and attached onto (landed on) recording medium 1. The ink droplets landed on recording medium 1 rapidly undergo gelation to form an ink image in a desired shape.

(Foil Transfer Unit)

Foil transfer unit 102 includes a pair of rollers (foil transfer nip rollers 120) that sandwich recording medium 1, foil-feeding spool 121 that supplies transfer foil 3 to a space between a pair of nip rollers 120, and wind-up spool 122 that recovers transfer foil 3 after transfer of the foil layer.

In foil transfer unit 102, the ink image formed in ink application unit 101 and the transfer surface of transfer foil 3 are pressure welded by nip roller 120. The pressure welding allows the foil layer of the transfer foil to be transferred onto the ink image, forming the foil image. On the other hand, transfer foil 3 pressure welded to recording medium 1 is recovered by wind-up spool 122.

(Actinic Radiation Irradiation Unit)

Actinic radiation irradiation unit 103 includes light irradiation section (light source) 131. Light irradiation section (light source) 131 is disposed so as to cover the entire width of recording medium 1. In actinic radiation irradiation unit 103, the actinic radiation-curable inkjet ink (ink image) is cured to allow the foil image to be fixed to the recording medium.

(Image Forming Unit)

Image forming unit 104 is a unit that applies each color ink to the recording medium, and the position thereof to be disposed is not particularly limited. For example, when an image other than the foil image is formed in image forming unit 104, image forming unit 104 can be disposed upstream of ink application unit 101 and foil transfer unit 102. On the other hand, when the foil image is colored in image forming unit 104, image forming unit 104 is disposed downstream of ink application unit 101 and foil transfer unit 102. When the actinic radiation-curable ink is applied in image forming unit 104, image forming unit 104 may be disposed between actinic radiation irradiation unit 103 and foil transfer unit 102, curing the ink applied in image forming unit 104 in actinic radiation irradiation unit 103.

Image forming unit 104 includes inkjet recording sections of a plurality of colors. Each of the inkjet recording sections includes head carriage 116' that accommodates a plurality of inkjet recording heads 114', ink passage 117' connected to head carriage 116', and ink tank 118' that stores the ink to be supplied through passage 117'. Inkjet recording head 114', head carriage 116', ink passage 117' and ink tank 118' of the image forming unit can be the same as the respective components of ink application unit 101.

In image forming unit 104, for example, each color ink is applied. For example, inks of yellow (Y), magenta (M), cyan (C) and black (K) from the respective inkjet recording sections are applied to recording medium 1, and various images are formed. The kind of the ink to be applied in image forming unit 104 is not particularly limited, and the ink may be the actinic radiation-curable ink as described above, or may be a solvent-based ink, or the like.

EXAMPLES

1. Examples of Embodiment 1

Synthesis of Copolymer Resin P-1

In a flask equipped with a dropping funnel, a reflux tube, a nitrogen introduction tube, a thermometer and a stirring apparatus was accommodated 186 parts by weight of 2-propanol, and heated under reflux while being bubbled with nitrogen. A monomer solution having the following composition was dropped through a dropping funnel into the flask over 2 hours. After dropping, the resultant was continuously heated under reflux for additional 5 hours and thereafter cooled, and 2-propanol was distilled off under reduced pressure to provide copolymer resin P-1. The following polymerization initiator was azobisisobutyronitrile (AIBN).

| | |
|---|---|
| Methyl methacrylate | 70 parts by weight |
| Ethyl acrylate | 10 parts by weight |

-continued

| | |
|---|---|
| 2-Ethylhexyl acrylate | 10 parts by weight |
| Methacrylic acid | 10 parts by weight |
| Polymerization initiator | 0.5 parts by weight |

The glass transition temperature Tg of copolymer resin P-1 obtained was measured, and the Tg of copolymer resin P-1 was 75° C. The Tg of copolymer resin P-1 was measured by heating copolymer resin P-1 in the range from −30 to 100° C. or 0 to 130° C. at a rate of 10° C./min in a nitrogen stream, thereafter cooling it, and again heating it at a rate of 10° C./min, according to differential scanning calorimetry (DSC).

In addition, the acid value (Acid Value, hereinafter, also referred to as "AV") of copolymer resin P-1 was measured, and the AV of copolymer resin P-1 was 65 mgKOH/g. The AV of copolymer resin P-1 was determined according to the following equation by dissolving 10 g of copolymer resin P-1 in about 50 mL of a solvent, adding a phenolphthalein indicator to the resulting solution, and subjecting the resultant to titration with a 0.1 mol/L potassium hydroxide solution in ethanol standardized in advance, to obtain the amount of the potassium hydroxide solution in ethanol used in the titration. AV=(B×f×5.611)/S In the equation, B represents the amount (mL) of dropping of the potassium hydroxide solution in ethanol, f represents the factor of the potassium hydroxide solution in ethanol, S represents the mass (g) of copolymer resin P-1, and 5.611 represents the value corresponding to 1/10 of the formula weight of potassium hydroxide (56.11/10).

In addition, the weight average molecular weight Mw of copolymer resin P-1 was measured, and the Mw of copolymer resin P-1 was 35,000. The Mw of copolymer resin P-1 was determined by gel permeation chromatography in the following measurement conditions.

Column: TSKgel G 40,000 $H_{XL}$, G 2,500 $H_{XL}$, and G 2000 $H_{XL}$, (manufactured by Tosoh Corporation)
Column temperature: 40° C.
Eluent: tetrahydrofuran
Flow rate of eluent: 1.0 mL/min
Detector: RI
Calibration curve: standard polystyrene Synthesis of Copolymer Resins P-2 to P-18 and R-1 to R-4

Each of copolymer resins P-2 to P-18 and R-1 to R-4 was synthesized in the same manner as in copolymer resin P-1 except that the kinds and the amounts of the monomers of the monomer solution were changed as shown in Table 1 and Table 2. In addition, the Tg, the AV and the Mw of each of P-2 to P-18 and R-1 to R-4 were determined as in those of copolymer resin P-1.

The monomer composition, and the Tg, the AV and the Mw of each of copolymer resins P-1 to P-18 and R-1 to R-4 are shown in Table 1 and Table 2. In Table 1 and Table 2, "MMA" represents methyl methacrylate, "EA" represents ethyl acrylate, "BA" represents butyl acrylate, "i-BA" represents isobutyl acrylate, "2-EHA" represents 2-ethylhexyl acrylate, "n-HA" represents n-hexyl acrylate, "CHA" represents cyclohexyl acrylate, "LA" represents lauryl acrylate, "SA" represents stearyl acrylate, "MA" represents methacrylic acid, and "AA" represents acrylic acid, respectively.

TABLE 1

| Copolymer resin | Monomer (parts by weight) ||||||||| | | Amount of (meth)acrylic acid alkyl ester*[1] (mass %) | Tg (° C.) | AV (mgKOH/g) | Mw (—) |
| | (Meth)acrylic acid alkyl ester |||||||| | (Meth)acrylic acid || | | | |
| | MMA | EA | BA | i-BA | 2-EHA | n-HA | CHA | LA | SA | MA | AA | | | | |
| P-1 | 70 | 10 | — | — | 10 | — | — | — | — | 10 | — | 20 | 75 | 65 | 35000 |
| P-2 | 71 | 7 | — | — | — | 12 | — | — | — | 10 | — | 19 | 72 | 65 | 60000 |
| P-3 | 75 | 6 | — | — | — | — | 6 | — | — | 13 | — | 12 | 104 | 85 | 30000 |
| P-4 | 40 | 40 | — | — | — | — | 10 | — | — | 10 | — | 50 | 35 | 65 | 25000 |
| P-5 | 62 | 10 | — | — | 10 | — | — | — | — | 18 | — | 20 | 81 | 117 | 45000 |
| P-6 | 62 | 15 | — | — | — | — | 15 | — | — | — | 8 | 30 | 61 | 62 | 45000 |
| P-7 | 77 | — | 7 | — | 7 | — | — | — | — | 9 | — | 14 | 80 | 59 | 30000 |
| P-8 | 66 | — | 15 | — | 10 | — | — | — | — | — | 9 | 25 | 51 | 70 | 45000 |
| P-9 | 60 | — | 5 | — | — | — | 20 | — | — | 15 | — | 25 | 81 | 98 | 75000 |
| P-10 | 70 | — | 10 | — | — | 10 | — | — | — | 10 | — | 20 | 89 | 65 | 30000 |
| P-11 | 47 | — | 30 | — | 8 | — | — | — | — | 15 | — | 38 | 33 | 98 | 25000 |
| P-12 | 62 | — | 15 | — | 15 | — | — | — | — | 8 | — | 30 | 46 | 52 | 50000 |
| P-13 | 70 | — | 15 | — | — | — | 5 | — | — | — | 10 | 20 | 68 | 78 | 30000 |
| P-14 | 64 | — | 20 | — | — | 5 | — | — | — | 11 | — | 25 | 69 | 72 | 40000 |
| P-15 | 81 | — | 3 | — | 3 | — | — | — | — | 13 | — | 6 | 108 | 85 | 65000 |
| P-16 | 60 | — | — | 20 | 10 | — | — | — | — | 10 | — | 30 | 61 | 65 | 45000 |
| P-17 | 65 | — | — | 10 | — | 15 | — | — | — | 10 | — | 25 | 94 | 65 | 25000 |
| P-18 | 60 | — | — | — | 30 | — | — | — | — | 10 | — | 30 | 48 | 65 | 30000 |

*[1]Amount of (meth)acrylic acid alkyl ester having $C_{2-12}$ alkyl group in monomer

TABLE 2

| Copolymer resin | Monomer (parts by weight) | | | | | | | | | | | Amount of (meth)acrylic acid alkyl ester*[1] (mass %) | Tg (° C.) | AV (mgKOH/g) | Mw (—) |
|---|---|---|---|---|---|---|---|---|---|---|---|---|---|---|---|
| | (Meth)acrylic acid alkyl ester | | | | | | | | | (Meth)acrylic acid | | | | | |
| | MMA | EA | BA | i-BA | 2-EHA | n-HA | CHA | LA | SA | MA | AA | | | | |
| R-1 | 70 | 5 | — | — | — | — | 5 | — | — | 20 | — | 10 | 119 | 130 | 45000 |
| R-2 | 22 | 50 | — | — | 10 | — | — | — | — | 18 | — | 60 | 22 | 117 | 30000 |
| R-3 | 70 | — | — | — | — | — | — | — | 20 | — | 10 | 0 | 90 | 78 | 45000 |
| R-4 | 65 | — | 15 | — | — | — | 15 | — | — | 5 | — | 30 | 58 | 33 | 45000 |

*[1]Amount of (meth)acrylic acid alkyl ester having C2-12 alkyl group in monomer Preparation of Ink K-1

A liquid having the following composition was heated, and stirred at 70° C. to dissolve copolymer resin P-1, providing an aqueous copolymer resin P-1 solution having a resin solid content of 20 mass %. The amount of ammonia in ammonia water was 1.05 equivalents of the acidic group of copolymer resin P-1.

| | |
|---|---|
| Copolymer resin P-1 | 10 parts by weight |
| Ion exchange water | 39.35 parts by weight |
| Ammonia water | 0.65 parts by weight |

Next, a liquid having the following composition was stirred and mixed, and the resulting solution was filtered through a filter having a pore diameter of 0.8 μm, thereby providing ink K-1. Herein, "KF-351A" was a silicone-based surfactant produced by Shin-Etsu Chemical Co., Ltd.

| | |
|---|---|
| Aqueous copolymer resin P-1 solution | 45 parts by weight |
| Ion exchange water | 29.5 parts by weight |
| Dipropylene glycol propyl ether | 10 parts by weight |
| 3-Methoxy-N,N-dimethylpropionamide | 15 parts by weight |
| KF-351A | 0.5 parts by weight |

Preparation of Inks K-2 to K-21

Each of inks K-2 to K-21 was prepared in the same manner as in ink K-1 except that the kind of the base and the kinds of the materials of the ink in the aqueous solution were changed as shown in Table 3. The amount of the base compound in the aqueous copolymer resin solution was 1.05 equivalents of the acidic group of the copolymer resin. Copolymer resin R-4 was not dissolved in the aqueous ammonia solution in preparation of the copolymer resin, the aqueous ammonia solution was clouded, and therefore ink (K-22) containing copolymer resin R-4 was not prepared.

The kind of the base and the kinds of the materials of each of inks K-1 to K-21 are shown in Table 3. In Table 3, "B-1" represents ammonia, "B-2" represents N,N-dimethylaminoethanol, and "B-3" represents 2-amino-2-methylpropanol, respectively. In addition, "PO-1" represents dipropylene glycol propyl ether, "PO-2" represents diethylene glycol monobutyl ether, and "PO-3" represents 1,2-hexanediol, respectively. In addition, "A-1" represents 3-methoxy-N,N-dimethylpropionamide, "A-2" represents 3-butoxy-N,N-dimethylpropionamide, and "A-3" represents 3-ethoxy-N,N-diethylpropionamide, respectively. In addition, "SA-1" represents a silicone-based surfactant KF-351A (produced by Shin-Etsu Chemical Co., Ltd.), "SA-2" represents a silicone-based surfactant BYK-347 (produced by BYK Japan), and "SA-3" represents a fluorochemical surfactant FC-430 (produced by 3M Company), respectively.

TABLE 3

| | Ink | Copolymer resin | Base | Organic solvent 1 | Organic solvent 2 | Surfactant |
|---|---|---|---|---|---|---|
| Example | K-1 | P-1 | B-1 | PO-1 | A-1 | SA-1 |
| | K-2 | P-2 | B-2 | PO-1 | A-1 | SA-1 |
| | K-3 | P-3 | B-1 | PO-2 | A-1 | SA-2 |
| | K-4 | P-4 | B-3 | PO-1 | A-1 | SA-3 |
| | K-5 | P-5 | B-1 | PO-3 | A-1 | SA-3 |
| | K-6 | P-6 | B-1 | PO-1 | A-1 | SA-2 |
| | K-7 | P-7 | B-1 | PO-1 | A-2 | SA-2 |
| | K-8 | P-8 | B-2 | PO-3 | A-2 | SA-1 |
| | K-9 | P-9 | B-1 | PO-2 | A-2 | SA-3 |
| | K-10 | P-10 | B-1 | PO-2 | A-2 | SA-3 |
| | K-11 | P-11 | B-1 | PO-3 | A-2 | SA-2 |
| | K-12 | P-12 | B-1 | PO-3 | A-2 | SA-2 |
| | K-13 | P-13 | B-1 | PO-1 | A-3 | SA-3 |
| | K-14 | P-14 | B-2 | PO-2 | A-3 | SA-3 |
| | K-15 | P-15 | B-1 | PO-1 | A-3 | SA-2 |
| | K-16 | P-16 | B-1 | PO-1 | A-3 | SA-2 |
| | K-17 | P-17 | B-3 | PO-1 | A-3 | SA-2 |
| | K-18 | P-18 | B-1 | PO-1 | A-3 | SA-2 |
| Comparative Example | K-19 | R-1 | B-1 | PO-1 | A-1 | SA-1 |
| | K-20 | R-2 | B-1 | PO-2 | A-1 | SA-2 |
| | K-21 | R-3 | B-1 | PO-3 | A-1 | SA-2 |

[Formation and Evaluation of Foil Image]

Ink K-1 was loaded to one of four rows of piezoelectric heads mounted in an on-demand inkjet printer, the heads having a nozzle diameter of 28 μm, a drive frequency of 18 kHz, a number of nozzles of 512, a minimum amount of droplets of 12 pL and a nozzle density of 180 dpi. The printer was configured to have a contact heater being capable of arbitrarily warming a recording medium from the rear surface (a surface opposite to a surface facing the heads) of the recording medium, to be provided with a blank ejection position of the ink and a maintenance unit of a blade wipe system at a head housing position, and to enable head cleaning to be performed at any frequency.

Next, an image including (1) a solid image region having a size of 10 cm×10 cm and having a duty of 100%, (2) such a solid image region having a size of 5 cm×10 cm, (3) a first fine line image region where a line image having a width of 2 mm was provided at 1.0 mm width intervals so as to be longitudinal (perpendicular) and lateral (parallel) to the paper-feeding direction, and (4) a second fine line image region where a line image having a width of 1 mm was provided at 0.5 mm width intervals longitudinally and laterally was printed by ink K-1 on a fleece wallpaper material as the recording medium at a printing resolution of 720 dpi×720 dpi.

In other words, in the foil image forming apparatus illustrated in FIG. 1, the foil of the foil sheet was directed downward as illustrated in FIG. 1, ink K-1 was ejected from the inkjet heads toward the recording medium for image formation, and the fleece wallpaper material and the foil sheet were sandwiched between the heating roller and the support roller and allowed to pass, thereby forming a latent image for a foil image.

The recording medium before heat-pressure bonding was warmed (preheated) by the heater from the rear surface thereof so that the surface temperature of the recording medium in heat-pressure bonding was 50° C. The surface temperature of the recording medium was measured by a noncontact thermometer (Model IT-530N manufactured by Horiba, Ltd.).

Thereafter, the recording medium and the foil sheet were allowed to pass through a space between the heating roller and the support roller, in which the temperature was set at 100° C., under pressure, and the foil sheet was then separated from the recording medium. Thus, the foil was transferred onto the recording medium so as to correspond to a latent image region formed by ink K-1. Thereafter, the recording medium was heated to 80° C. and dried by a heating and drying apparatus to provide a foil image. The resulting foil image was evaluated with respect to the following items.

(1) Fine Line Reproducibility

The first fine line image region and the second fine line image region were observed macroscopically, and visually by a magnifier of 10×, and the presence of any excessive foil between fine lines and the presence of any foil failures on fine lines were evaluated according to the following criteria. Rates A, B and C were defined as allowance, and Rate D was defined as non-allowance.

A: It was confirmed from magnifier observation that both the two fine line images had no excessive foil between fine lines and had no foil failures on fine lines.

B: Minute failures were observed in the fine line image with a width of 0.5 mm, but had no problems by macroscopic observation.

C: It was confirmed from macroscopic observation that any excessive foil between fine lines partially remained, but was acceptable in practical use.

D: Any fine lines, which could not be reproduced, were macroscopically observed.

(2) Abrasion Resistance

A foil portion of the foil image left to stand under an environment of 30° C. and 80% RH for 12 hours was abraded by a dry cotton fabric (Cannequin #3) under a load of 400 g, the surface abraded of the foil portion was observed visually and by a magnifier of 10×, and the abrasion resistance was evaluated according to the following criteria.

A: Neither fine flaws nor peeling which could be confirmed by magnifier observation was observed even after abrasion was made 50 times or more.

B: Fine flaws and peeling which could be confirmed by magnifier observation were observed after abrasion 50 times, but had no problems in macroscopic observation.

C: Fine flaws and peeling which could be confirmed by macroscopic observation were observed during abrasion 21 to 50 times, but were acceptable in practical use.

D: Peeling was macroscopically confirmed during abrasion 20 times or less.

(3) Adhesion Strength

After the foil image was left to stand under an environment of 30° C. and 80% RH for 12 hours, a tape ("Scotch Mending Tape MP-18" produced by Sumitomo 3M Limited) was attached to a solid image region of the foil image, having a size of 5 cm×10 cm, the tape was then peeled by hand, the portion of the foil image, where the tape was peeled, was observed macroscopically and by a magnifier of 10×, and the adhesion strength was evaluated according to the following criteria.

A: Any fine peeling which could be confirmed by magnifier observation was not observed.

B: Any fine peeling which could be confirmed by magnifier observation was observed, but had no problems in macroscopic observation.

C: Any fine peeling which could be confirmed by macroscopic observation was observed, but was acceptable in practical use.

D: Any peeling was macroscopically confirmed.

(4) Bending Resistance

The foil image was wrapped on a stainless rod having a diameter of 3 mm so that the foil image faced outward, the occurrence of defects such as floating, peeling, cracking, and the like of the foil of the foil image was here visually observed, and the bending resistance was evaluated according to the following criteria.

A: No occurrence of floating, peeling and cracking due to wrapping was observed at all.

B: The occurrence of slight floating, peeling and cracking due to wrapping 10 times or more was observed.

C: The occurrence of slight floating, peeling and cracking due to wrapping twice or more and less than 10 times was observed.

D: The occurrence of clear floating, peeling and cracking due to wrapping once was observed.

A foil image was formed and evaluated in the same manner as described above except that each of inks K-2 to K-21 was used instead of ink K-1. The evaluation results of each ink are shown in Table 4.

TABLE 4

| | | Evaluation results | | | |
|---|---|---|---|---|---|
| | Ink | Fine line reproducibility | Abrasion resistance | Adhesion strength | Bending resistance |
| Example | K-1 | A | A | A | A |
| | K-2 | A | A | A | A |
| | K-3 | B | A | B | B |
| | K-4 | A | B | B | A |
| | K-5 | B | B | C | B |
| | K-6 | A | A | A | A |
| | K-7 | A | A | A | A |
| | K-8 | A | A | A | A |
| | K-9 | A | A | A | A |
| | K-10 | A | A | A | A |
| | K-11 | A | B | B | A |
| | K-12 | B | C | B | B |
| | K-13 | A | A | A | A |
| | K-14 | A | A | A | A |
| | K-15 | B | B | B | C |
| | K-16 | A | A | A | A |
| | K-17 | A | A | A | B |
| | K-18 | B | C | B | B |
| Comparative Example | K-19 | D | D | C | D |
| | K-20 | C | D | D | C |
| | K-21 | C | D | C | C |

It was revealed from Table 4 that the foil image formed using each of inks K-1 to K-18 had sufficient fine line reproducibility, abrasion resistance, adhesion strength and bending resistance. The reason for this was considered because all inks K-1 to K-18 contained water and a water-soluble organic solvent, all copolymer resins P-1 to P-18 were each the copolymer of the monomer including (meth)acrylic acid, and (meth)acrylic acid alkyl ester having a $C_{2-12}$ alkyl group, the AV was 50 to 120 mgKOH/g, and the Tg was 30 to 110° C.

On the other hand, the foil image formed using ink K-19 was insufficient in fine line reproducibility, abrasion resistance and bending resistance. The reason for this was considered because both the AV and the Tg of copolymer resin R-1 were too high.

In addition, the foil image formed using ink K-20 was insufficient in abrasion resistance and adhesion strength. The reason for this was considered because the proportion of the (meth)acrylic acid alkyl ester in copolymer resin R-2 was too high, resulting in a too low Tg of copolymer resin R-2.

In addition, the foil image formed using ink K-21 was insufficient in abrasion resistance. The reason for this was considered because the alkyl group of the (meth)acrylic acid alkyl ester in copolymer resin R-3 was too long and ink K-21 was not sufficiently extended to fine irregularities on the surface of the recording medium or the foil.

2. Examples of Embodiment 2

The following materials were used as the materials of the actinic radiation-curable inkjet ink.

(Gelling Agent)

Distearyl ketone (KAO wax T1 produced by Kao Corporation), (18-Pentatriacontanone, reagent produced by Arfa Aeser)

Behenyl behenate (UNISTAR M-2222SL produced by NOF Corporation)

Stearyl stearates (EXCEPARL SS produced by Kao Corporation), (UNISTAR M-9676 produced by NOF Corporation), (EMALEX CC-18, produced by Nihon Emulsion Co., Ltd.), (AMREPS SS produced by Kokyu Alcohol Kogyo Co., Ltd.)

Behenic acid (Lunak BA produced by Kao Corporation)
Behenyl alcohol (Kalcol 220-80 produced by Kao Corporation)

Cetyl palmitate (AMREPS PC produced by Kokyu Alcohol Kogyo Co., Ltd.)

(Photocurable Compound)

Photomer 4072 (produced by Cognis): 3PO-modified trimethylolpropane triacrylate: molecular weight: 471

Miramer M360 (produced by Miwon Specialty Chemical Co., Ltd.): trimethylolpropane PO-modified triacrylate: molecular weight: 471

NK Ester DOD-N (produced by Shin-Nakamura Chemical Co., Ltd.): 1,10-decanedioldimethacrylate: molecular weight: 310

NK Ester A-DCP (produced by Shin-Nakamura Chemical Co., Ltd.): tricyclodecanedimethanol diacrylate; molecular weight: 304

NK Ester A-400 (produced by Shin-Nakamura Chemical Co., Ltd.): polyethylene glycol diacrylate CD561 (produced by Sartomer): alkoxylated hexanediol diacrylate SR499 (produced by Sartomer): 6EO-modified trimethylolpropane triacrylate SR494 (produced by Sartomer): 4EO-modified pentaerythritol tetraacrylate (Photopolymerization Initiator)

DAROCURE TPO (produced by BASF SE)

ITX (produced by DKSH Japan)

(Non-Polymerizable Resin)

TEGO AddBond LTH (produced by EVONIK INDUSTRIES, hydroxyl group- and carboxyl group-containing polyester resin, acid value: 16 mgKOH/g; base value: 25 mgKOH/g; number average molecular weight: 2,000 to 3,000)

TEGO VARIPLUS SK (produced by Degussa AG, hydroxyl group-containing ketone resin, acid value: less than 3 mgKOH/g; base value: 325 mgKOH/g; number average molecular weight: 1,000 to 1,500)

Synthesis Example 1

Respective components were mixed according to the following composition (mass ratio) in Table 5, and heated to 80° C. and stirred. While the temperature of the resulting solution was kept, the solution was filtered by a 3-μm Teflon (registered trademark) membrane filter manufactured by ADVATEC, preparing actinic radiation-curable inkjet ink 1.

Synthesis Examples 2 to 12

Each of actinic radiation-curable inkjet inks 2 to 12 was prepared by the same method as in Synthesis Example 1 except that each composition shown in Table 5 was adopted.

TABLE 5

| | | | Synthesis Example 1 | Synthesis Example 2 | Synthesis Example 3 | Synthesis Example 4 | Synthesis Example 5 | Synthesis Example 6 |
|---|---|---|---|---|---|---|---|---|
| Composition | Gelling agent | Distearyl ketone | 2 | | 1.5 | 3 | | |
| | | Behenyl behenate | 1 | 5 | | | | |
| | | Stearyl stearate | | | | 2 | | |
| | | Behenic acid | | | | | 5 | |
| | | Behenyl alcohol | | | | | | 5 |
| | | Cetyl palmitate | | | | | | |
| | | Total | 3 | 5 | 1.5 | 5 | 5 | 5 |
| | Photocurable compound | Photomer 4072 | 34 | | | 30 | | 31 |
| | | Miramer M360 | | 30 | | | | |
| | | NK Ester DOD-N | | | 33.5 | | | |
| | | NK Ester A-DCP | | | | | 26 | |
| | | NK Ester A-400 | 28 | 28 | 28 | 28 | 28 | |
| | | CD561 | | | | | | 28 |
| | | SR499 | 20 | 20 | 20 | 20 | 20 | 20 |
| | | SR494 | 5 | 5 | 5 | 5 | 10 | 5 |
| | Non-polymerizable resin | TEGO AddBond LTH | 3 | 5 | 5 | 5 | 4 | |
| | | TEGO VARIPLUS SK | | | | | | 4 |

TABLE 5-continued

| | | | | | | | | |
|---|---|---|---|---|---|---|---|---|
| | Photopolymerization initiator | DAROCURE TPO | 5 | 5 | 5 | 5 | 5 | 5 |
| | | ITX | 2 | 2 | 2 | 2 | 2 | 2 |
| Sol-gel phase transition temperature (° C.) | | | 60 | 58 | 55 | 60 | 57 | 55 |

| | | | Synthesis Example 7 | Synthesis Example 8 | Synthesis Example 9 | Synthesis Example 10 | Synthesis Example 11 | Synthesis Example 12 |
|---|---|---|---|---|---|---|---|---|
| Composition | Gelling agent | Distearyl ketone | 2 | | 10 | 6 | 0.3 | |
| | | Behenyl behenate | | | | | | |
| | | Stearyl stearate | | | | 10 | | |
| | | Behenic acid | | | | | | |
| | | Behenyl alcohol | | | | | | |
| | | Cetyl palmitate | 2 | 0.5 | | | | |
| | | Total | 4 | 0.5 | 10 | 16 | 0.3 | 0 |
| | Photocurable compound | Photomer 4072 | | 20 | | | | 27 |
| | | Miramer M360 | 23 | | 30 | 20 | 31.7 | |
| | | NK Ester DOD-N | | | | | | |
| | | NK Ester A-DCP | | 42.5 | | | | |
| | | NK Ester A-400 | 28 | | 28 | 28 | 28 | 28 |
| | | CD561 | | | | | | |
| | | SR499 | 28 | | 15 | 20 | 20 | 28 |
| | | SR494 | 5 | 25 | 5 | 5 | 10 | 5 |
| | Non-polymerizable resin | TEGO AddBond LTH | | | | | | |
| | | TEGO VARIPLUS SK | 5 | 5 | 5 | 4 | 3 | 5 |
| | Photopolymerization initiator | DAROCURE TPO | 5 | 5 | 5 | 5 | 5 | 5 |
| | | ITX | 2 | 2 | 2 | 2 | 2 | 2 |
| Sol-gel phase transition temperature (° C.) | | | 55 | 56 | 66 | 71 | 49 | — |

Example 2-1

Application of Actinic Radiation-Curable Inkjet Ink

The actinic radiation-curable inkjet ink prepared in Synthesis Example 1 was filled in ink tank 118 of the ink application unit of the foil image forming apparatus illustrated in FIG. 6. The actinic radiation-curable inkjet ink was continuously discharged (driven) to a recording medium (base paper for PVC wallpaper, thickness: 1,000 μm manufactured by KJ Specialty Paper Co., Ltd.,) including vinyl chloride in conditions of an amount of droplets of 14 pl, a printing rate of 0.5 m/sec, an ejection frequency of 10.5 kHz, and a coverage rate of 100%. The temperature of the recording medium in landing of the actinic radiation-curable inkjet ink was adjusted to 25° C. The temperature was measured using an infrared thermometer "IR0510" (manufactured by Konica Minolta Inc.).

Transfer of Foil

A transfer foil (BL No. 2 Gold 2.8 manufactured by Murata Kimpaku Co., Ltd.) was set to foil-feeding spool 121 of the foil transfer unit of the foil image forming apparatus illustrated in FIG. 6. A roll where a silicone rubber layer having a thickness of 1.5 mm was disposed on an aluminum substrate having a length of 357 mm, an outer diameter of 62 mm and a thickness of 5 mm was used for a nip roller (heating roller) located closer to the transfer foil.

On the other hand, a roll where a silicone rubber layer having a thickness of 1.5 mm was disposed on an aluminum substrate having a length of 357 mm, an outer diameter of 52 mm and a thickness of 5 mm was used for nip roller (pressure roller) 120 located closer to recording medium 1. The nip width between the heating roller and the pressure roller was 7 mm. The surface pressure on the nip was 290 kPa.

The paper-feeding rate in a foil fixation apparatus was 100 mm/sec.

A peeling roller having a roll diameter of 10 mm was used for a peeling apparatus.

The temperature of the heating roller was 45° C.

Examples 2-2 to 2-5

Each foil image was formed in the same manner as in Example 2-1 except that the recording medium was changed to each recording medium shown in Table 6, or the temperature of the recording medium in landing of the actinic radiation-curable inkjet ink was changed to each temperature shown in Table 6.

Comparative Examples 2-1 to 2-6

Each foil image was formed in the same manner as in Example 2-1 except that the actinic radiation-curable inkjet ink was changed to each ink shown in Table 6, the recording medium was changed to each recording medium shown in Table 6, or the temperature of the recording medium in landing of the actinic radiation-curable inkjet ink was changed to each temperature shown in Table 6.

[Evaluation]

The fine line reproducibility, adhesion strength and water resistance of the foil layer produced in each of Examples 2-1 to 2-5 and Comparative Examples 2-1 to 2-6 were evaluated as follows. The evaluation results are shown in Table 6.

(Fine Line Reproducibility (Evaluation of Presence of Burr))

Two fine line images were produced: a foil image where a line image having a width of 2 mm was provided at 1.0 mm width intervals so as to be longitudinal (perpendicular) and lateral (parallel) to the paper-feeding direction; and a foil image where a line image having a width of 1 mm was provided at 0.5 mm width intervals longitudinally and laterally. The two fine line images were observed macroscopically, and visually by a magnifier of 10×, and the presence of any excessive foil between fine lines and the presence of any foil failures on fine lines were evaluated according to the following criteria. Rates A, B and C were defined as allowance, and Rate D was defined as non-allowance.

A: It was confirmed from magnifier observation that both the two fine line images had no excessive foil between fine lines and had no foil failures on fine lines.

B: Minute failures were observed in the fine line image with a width of 0.5 mm, but had no problems by macroscopic observation.

C: It was confirmed from macroscopic observation that any excessive foil between fine lines partially remained, but was acceptable in practical use.

D: Any fine lines, which could not be reproduced, could be macroscopically observed, and were unacceptable in practical use.

(Water Resistance)

A foil image (solid patch image) formed in a size of 5 cm×10 cm was left to stand under an environment of a humidity of 80% Rh and a temperature of 40° C. for 5 days. The surface of the foil image taken out from the environment was observed macroscopically, and visually by a magnifier of 10×, and the presence of foil failures on the surface of the foil image was evaluated according to the following criteria.

A: Neither fine flaws nor peeling which could be confirmed by magnifier observation was observed.

B: Any fine flaws and peeling which could be confirmed by magnifier observation were observed, but were determined to have no problems in macroscopic observation.

C: Any fine flaws and peeling which could be confirmed by macroscopic observation were observed, but were acceptable in practical use.

D: Peeling could be macroscopically confirmed, and was unacceptable in practical use.

TABLE 6

| | Recording medium | Temperature of recording medium | Ink No. | Type of ink | Amount of gelling agent*1 (wt %) | Sol-gel phase transition temperature (° C.) | Sol-gel phase transition temperature − recording medium temperature (° C.) | Fine line reproducibility | Adhesion strength | Water resistance |
|---|---|---|---|---|---|---|---|---|---|---|
| Example 2-1 | Vinyl chloride | Ordinary temperature (25° C.) | 1 | UV gel | 3 | 60 | 35 | A | B | A |
| Example 2-2 | Fleece | Ordinary temperature (25° C.) | 1 | UV gel | 3 | 60 | 35 | A | A | A |
| Example 2-3 | Japanese paper | Ordinary temperature (25° C.) | 1 | UV gel | 3 | 60 | 35 | A | B | A |
| Example 2-4 | Coated paper | Ordinary temperature (25° C.) | 1 | UV gel | 3 | 60 | 35 | A | B | A |
| Example 2-5 | Vinyl chloride | 30° C. | 1 | UV gel | 3 | 60 | 30 | B | B | A |
| Comparative Example 2-1 | Vinyl chloride | Ordinary temperature (25° C.) | 12 | UV | — | — | — | C | B | D |
| Comparative Example 2-2 | Fleece | Ordinary temperature (25° C.) | 12 | UV | — | — | — | D | C | D |
| Comparative Example 2-3 | Japanese paper | Ordinary temperature (25° C.) | 12 | UV | — | — | — | D | C | D |
| Comparative Example 2-4 | Coated paper | Ordinary temperature (25° C.) | 12 | UV | — | — | — | C | C | D |
| Comparative Example 2-5 | Vinyl chloride | Ordinary temperature (25° C.) | 13*2 | Latex | — | — | — | D | C | C |
| Comparative Example 2-6 | Vinyl chloride | 50° C. | 1 | UVgel | 3 | 60 | 10 | D | B | A |

*1The amount of the gelling agent corresponded to the proportion of the amount of the gelling agent based on the total mass of the actinic radiation-curable inkjet ink.
*2A latex ink produced by HP Development Company, L.P. was used for the latex type ink.

(Evaluation of Adhesion Strength)

After a tape was attached to a foil image (solid patch image) formed in a size of 5 cm×10 cm, the tape was peeled by hand. The foil image in peeling of the tape was observed macroscopically and by a magnifier of 10×, and the adhesion strength was evaluated according to the following criteria. For the tape, "Scotch Mending Tape MP-18 (produced by Sumitomo 3M Limited)" was used.

A: Any fine peeling which could be confirmed by magnifier observation was not observed.

B: Any fine peeling which could be confirmed by magnifier observation was observed, but was determined to have no problems in macroscopic observation.

C: Any fine voids and peeling which could be confirmed by macroscopic observation were observed, but were acceptable in practical use.

D: Any peeling was macroscopically confirmed, and was unacceptable in practical use.

As shown in Table 6, when the actinic radiation-curable inkjet ink including 3 mass % of the gelling agent was used and the difference between the temperature of the recording medium in landing of the ink and the sol-gel phase transition temperature of the ink was 30° C. or more (Examples 2-1 to 2-5), the fine line reproducibility of the foil image was good.

In particular, when the difference between the temperature of the recording medium in landing of the ink and the sol-gel phase transition temperature of the ink was 35° C. (Examples 2-1 to 2-4), the fine line reproducibility was good even on any recording medium. It was presumed that the gelation rate of the ink was increased on the recording medium, making it difficult to spread the ink due to wetting.

On the contrary, even when the actinic radiation-curable inkjet ink including the gelling agent was used, the fine line reproducibility of the foil image was low when the difference between the temperature of the recording medium in landing of the ink and the sol-gel phase transition temperature of the ink was 10° C. (Comparative Example 2-6).

On the other hand, when the actinic radiation-curable inkjet ink did not include the gelling agent (Comparative Examples 2-1 to 2-5), the fine line reproducibility was low. It was presumed that the ink was spread due to wetting after landing thereof on the recording medium.

In addition, when the ink included the gelling agent (Examples 2-1 to 2-5 and Comparative Example 2-6), adhesiveness to the solid image was high. It was presumed that when the ink included such a gelling agent, the ink was easily retained on the surface of the recording medium and sufficient adhesiveness was achieved. On the other hand, it was presumed that when the ink did not include the gelling agent, the ink easily penetrated into depressed portions of the recording medium having irregularities or the like and sufficient adhesiveness was hardly achieved.

Furthermore, when the ink included the gelling agent having a C12 or higher linear hydrocarbon group (Examples 2-1 to 2-5 and Comparative Example 2-6), the water resistance of the foil image was easily increased. When the ink includes such a gelling agent, the alkyl chain is easily oriented to the ink droplet surface after landing of the ink on the recording medium. In other words, the adhesive layer obtained by curing the ink droplets includes a large number of the alkyl chains on the layer surface. It is therefore presumed that the adhesive layer is hardly swollen and the like due to external moisture.

Examples 2-7 to 2-15 and Comparative Examples 2-7 to 2-8

Each foil image was formed in the same manner as in Example 2-1 except that the actinic radiation-curable inkjet ink or the temperature of the recording medium in landing of the actinic radiation-curable inkjet ink was changed as shown in Table 7.

[Evaluation]

The fine line reproducibility, adhesion strength and water resistance of the foil layer produced in each of Examples 2-7 to 2-15 and Comparative Examples 2-7 to 2-8 were evaluated as follows. The evaluation results are shown in Table 7.

As shown in Table 7, when the actinic radiation-curable inkjet ink including 0.5 to 10 mass % of the gelling agent was used and the difference between the temperature of the recording medium in landing of the ink and the sol-gel phase transition temperature of the ink was 30° C. or more (Examples 2-7 to 2-15), the fine line reproducibility of the foil image was good.

On the other hand, even when the actinic radiation-curable inkjet ink including the gelling agent was used, fine line reproducibility and adhesiveness to the solid image were low when the amount of the gelling agent was more than 10 mass % (Comparative Example 2-7). It was presumed that an excessive amount of the gelling agent was included to thereby cause sufficient adhesiveness to the foil layer and the recording medium to be hardly achieved.

In addition, when the amount of the gelling agent was less than 0.5 mass %, fine line reproducibility and adhesiveness to the solid image were low (Comparative Example 2-8). It was presumed that the ink landed on the recording medium did not sufficiently undergo gelation and was hardly pinned, resulting in deteriorations in fine line reproducibility and the like.

This application claims priority based on Japanese Patent Application No. 2014-151699, filed on Jul. 25, 2014 and Japanese Patent Application No. 2014-172547, filed on Aug. 27, 2014, the entire contents of which including the specifications and the drawings are incorporated herein by reference.

INDUSTRIAL APPLICABILITY

The inkjet image forming method of the present invention can allow a foil image having high durability to be formed, regardless of hydrophilicity of a recording medium. Accordingly, the present invention is expected to contribute to diffusion of a foil image with a recording medium on which a foil image has been difficult to form, and further diffusion of a foil image having high designability.

TABLE 7

| | Recording medium | Temperature of recording medium | Ink No. | Type of ink | Amount of gelling agent[*1] (wt %) | Sol-gel phase transition temperature (° C.) | Sol-gel phase transition temperature − recording medium temperature (° C.) | Fine line reproducibility | Adhesion strength | Water resistance |
|---|---|---|---|---|---|---|---|---|---|---|
| Example 2-7 | Vinyl chloride | Ordinary temperature (25° C.) | 2 | UV gel | 5 | 58 | 33 | A | B | A |
| Example 2-8 | Vinyl chloride | Ordinary temperature (25° C.) | 3 | UV gel | 1.5 | 55 | 30 | A | B | A |
| Example 2-9 | Vinyl chloride | Ordinary temperature (25° C.) | 4 | UV gel | 3 | 60 | 35 | A | B | A |
| Example 2-10 | Vinyl chloride | Ordinary temperature (25° C.) | 5 | UV gel | 5 | 57 | 32 | B | C | B |
| Example 2-11 | Vinyl chloride | Ordinary temperature (25° C.) | 6 | UV gel | 5 | 55 | 30 | B | C | B |
| Example 2-12 | Vinyl chloride | Ordinary temperature (25° C.) | 7 | UV gel | 4 | 55 | 30 | A | B | A |
| Example 2-13 | Vinyl chloride | Ordinary temperature (25° C.) | 8 | UV gel | 0.5 | 56 | 31 | A | B | A |
| Example 2-14 | Vinyl chloride | Ordinary temperature (25° C.) | 9 | UV gel | 10 | 66 | 41 | A | B | A |
| Example 2-15 | Vinyl chloride | 0° C. | 9 | UV gel | 1.5 | 66 | 66 | A | B | A |
| Comparative Example 2-7 | Vinyl chloride | Ordinary temperature (25° C.) | 10 | UV gel | 16 | 71 | 46 | D | D | D |
| Comparative Example 2-8 | Vinyl chloride | Ordinary temperature (25° C.) | 11 | UV gel | 0.3 | 49 | 24 | D | D | D |

[*1]The amount of the gelling agent corresponded to the proportion of the amount of the gelling agent based on the total mass of the actinic radiation-curable inkjet ink.

REFERENCE SIGNS LIST

1 Recording medium
2 ink image
2' adhesive layer
3 transfer foil
4 support material
5 foil layer
5' foil layer
10 foil image forming apparatus
11 inkjet head
12 heating roller
13 support roller
14 peeling member
15 wind-up roller
21 recording medium
22 adhesive ink
30 foil sheet
31 base sheet
32 foil

The invention claimed is:

1. A foil image forming method comprising:
dropping an actinic radiation-curable inkjet ink that comprises a gelling agent, a photocurable compound and a photopolymerization initiator and that undergoes sol-gel phase transition depending on a temperature, onto a recording medium to form an ink image comprising droplets of the actinic radiation-curable inkjet ink;
pressure bonding a transfer surface of transfer foil comprising a foil layer to the ink image to transfer the foil layer onto the ink image; and
irradiating the ink image with an actinic radiation to cure the actinic radiation-curable inkjet ink, allowing the foil layer to be fixed on the recording medium, wherein the actinic radiation-curable inkjet ink comprises 0.5 to 10 mass % of the gelling agent based on a total mass of the actinic radiation-curable inkjet ink, and
a difference between a temperature of the recording medium in landing of the actinic radiation-curable inkjet ink and a sol-gel phase transition temperature of the actinic radiation-curable inkjet ink is 30° C. or more.

2. The foil image forming method according to claim 1, wherein the difference between a temperature of the recording medium in landing of the actinic radiation-curable inkjet ink and a sol-gel phase transition temperature of the actinic radiation-curable inkjet ink is 30° C. or more and 70° C. or less.

3. The foil image forming method according to claim 1, wherein the gelling agent is represented by general formula (1) or (2) below:

$$R_1\text{—CO—}R_2 \qquad (1)$$

wherein $R_1$ and $R_2$ each represent a $C_{1\text{-}24}$ linear or branched hydrocarbon group, and any one of $R_1$ and $R_2$ comprises a $C_{12}$ or higher linear alkyl structure; and $$R_3\text{—COO—}R_4 \qquad (2)$$

wherein $R_3$ represents a $C_{1\text{-}24}$ linear or branched hydrocarbon group, $R_4$ represents a hydrogen atom or a $C_{1\text{-}24}$ linear or branched hydrocarbon group, and any one of $R_3$ and $R_4$ comprises a $C_{12}$ or higher linear alkyl structure.

4. The foil image forming method according to claim 1, wherein the recording medium is a wallpaper material.

5. The foil image forming method according to claim 4, wherein the wallpaper material comprises a non-woven fabric in which natural pulp and synthetic fiber are mixed.

* * * * *